United States Patent [19]

Tieden et al.

[11] 4,017,831
[45] Apr. 12, 1977

[54] N/C MACHINE PAGING, STATUS AND REPORT SYSTEM

[75] Inventors: Jansey D. Tieden, Puyallup; Forester E. Woodruff, Jr., Renton, both of Wash.

[73] Assignee: The Boeing Company, Seattle, Wash.

[22] Filed: Mar. 15, 1976

[21] Appl. No.: 666,641

[52] U.S. Cl. .......................... 340/147 P; 340/163
[51] Int. Cl.² ........................................ H04Q 9/00
[58] Field of Search ....... 340/147 D, 147 R, 147 A, 340/163, 311, 312

[56] References Cited
UNITED STATES PATENTS 3,418,650  12/1968  Rich .......................... 340/312 X

*Primary Examiner*—Harold Pitts
*Attorney, Agent, or Firm*—Christensen, O'Connor, Garrison & Havelka

[57] ABSTRACT

A system for continuously, automatically sensing the setting of operator controlled switches that denote: (1) the need for operator assistance [CALL]; and, (2) the operational status [STATUS] of a plurality of numerically controlled (N/C) machines is disclosed. The sensed CALL and STATUS information is transmitted, in a highly noise immune push-pull voltage manner, from the N/C machine locations (e.g., shop area) to a central processing unit (CPU) located in a control room. The CPU processes the received information and in accordance therewith transmits CALL control signals to one or more visual paging boards located in the shop area and to a status display board located in the control room. The status board displays, in real time, the STATUS information and CALL information, plus the elapsed time since a particular STATUS state started, or a particular CALL was made. In addition, a teletype or other suitable data terminal may transmit certain information (such as routine maintenance CALLS) to other locations (e.g., a maintenance room). Also, an on-line teletype which records all CALL transactions and provides a continuous record of system operations is included. Further, the CPU continuously accumulates and stores operational data and controls output devices such that management reports in either visual form (printouts) or storable form (punchtape, magnetic disc, magnetic tape, magnetic cards, etc.) are automatically produced at selected intervals, i.e., daily, weekly, monthly etc.

18 Claims, 25 Drawing Figures

PUSH-PULL SIGNAL CONFIGURATION

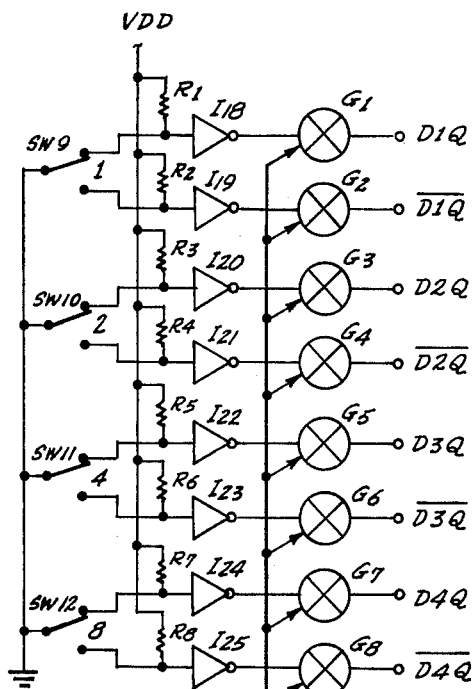
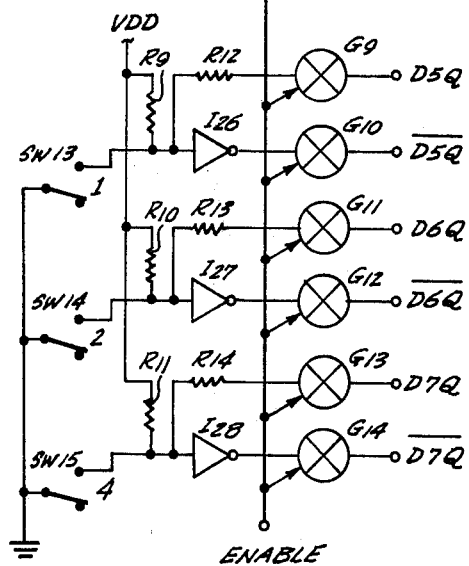
Fig. 12.
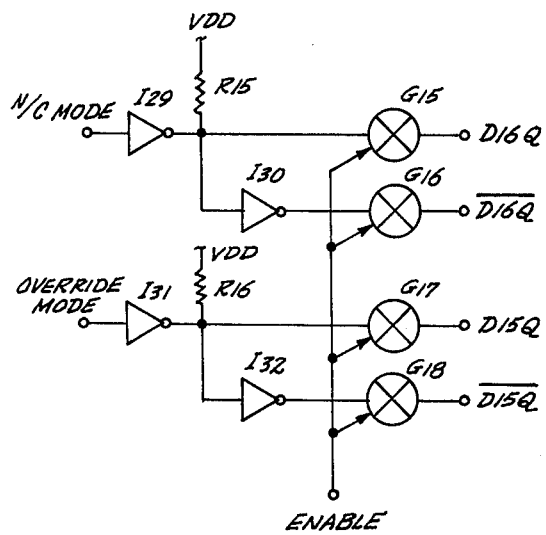
Fig. 13.
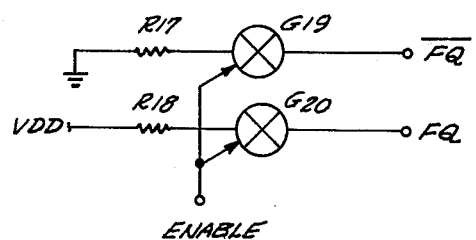
Fig. 14.

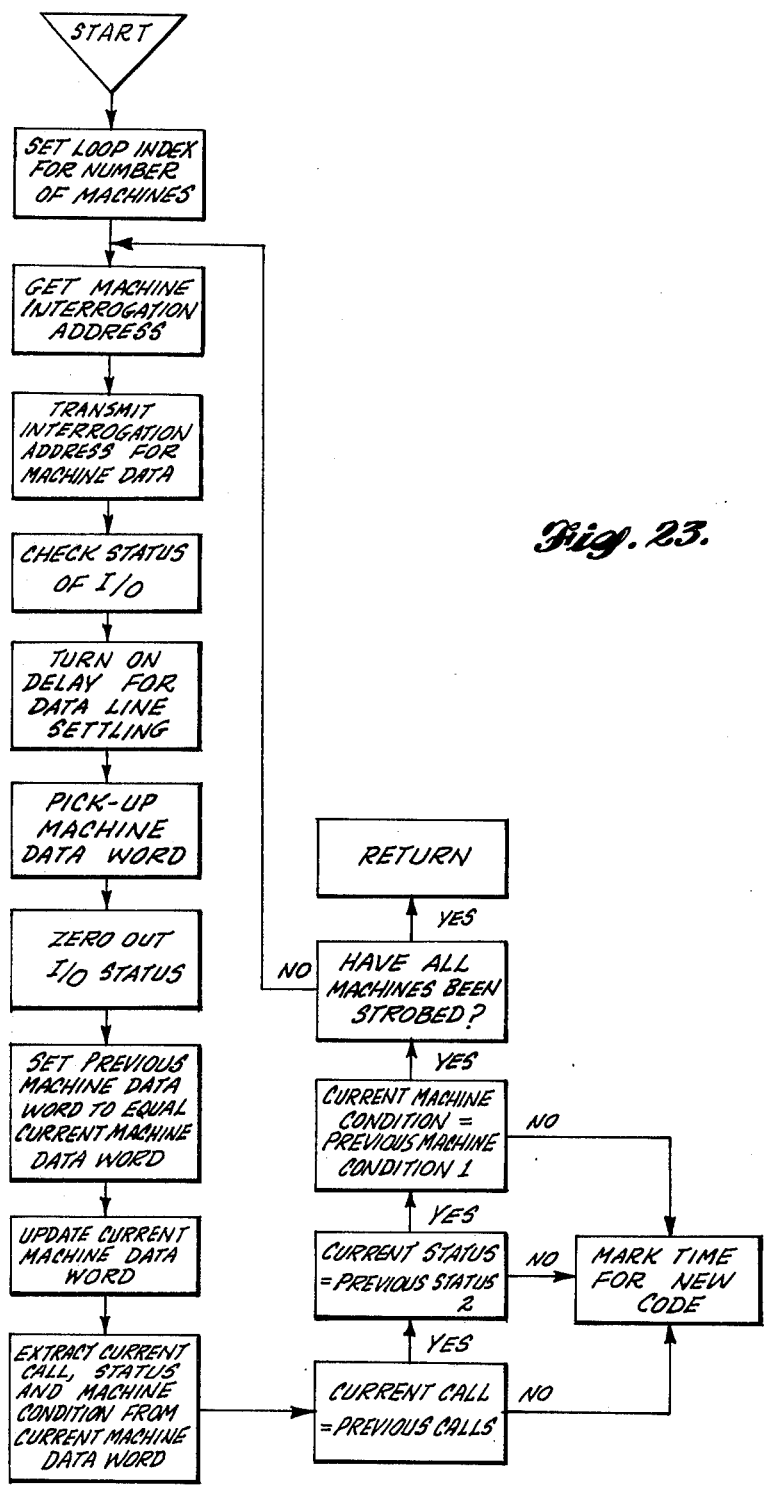

N/C MACHINE PAGING, STATUS AND REPORT SYSTEM

BACKGROUND OF THE INVENTION

This invention is directed to N/C machine systems and, more particularly, to systems for improving the productivity of N/C machines.

Typically, a numerically controlled (N/C) machine tool area consists of a large number of closely spaced machine tools. Normally, the machines are positioned along aisleways with various size machines being intermixed. In most cases, the machines are constructed such that the machine operating station is located at some distance from the adjacent aisle. Since the operator is literally surrounded by machinery, visibility of, or by, the operator is very difficult. Various shop support personnel (i.e., supervisors, area men, relief operators, tool kitters and maintenance personnel) are provided to sustain the production of the N/C machines. However, due to the position of the machine operating stations, an operator cannot easily communicate with shop support personnel. And, rarely, are support personnel present when they are needed. Because of this difficulty, in the past, when support or assistance was required, an operator had two options. He could wait at his machine operating station until the required support personnel appeared; or, he could turn off his machine, leave this station, and seek the required person or service. In either case, the end result was reduced productivity because the chip cutting time of the machine was curtailed. In one sampling study of an N/C machine tool area consisting of 81 N/C machines, it was found that 5.4% of an operator's time was spent non-productively away from his machine looking for support personnel. Another 3.1% was spent non-productively waiting for machine support personnel. Obviously, the loss in available machine hours for a machine tool area of any size is substantial.

Another problem area that is inherent in the management of large concentrations of N/C machine tools is the lack of real time knowledge of machine status, and the difficulty of solving manufacturing problems caused by this lack of real time knowledge. The lack of such knowledge is generally the result of communication difficulties. In this regard, the ambient noise level in a machine tool environment is often at or near 90 decibels. Thus, voice communication (e.g., telephone, etc.) is very difficult. Plant paging systems are essentially ineffective and pocket radio paging devices simply do not work satisfactorily.

Another problem, which is also of a communication nature, relates to the difficulty in providing management with detailed information about the operation of large N/C machine tool manufacturing complexes. In the past, often paper and pencil methods of data collection have been used to gather historical data. Reports are usually produced on a weekly or monthly basis. Because the report information is historical rather than real time, problem solving is more difficult and time consuming than it would be if real time information were available. Routine problems have often taken hours to solve, and difficult problems have taken days.

It will be appreciated that all of the foregoing problems contribute to a decrease in the chip cutting time of the N/C machine. Chip cutting time is, obviously, the amount of time that the machine is actually producing parts and, thus, is a measure of the productivity of a machine. Lack of rapid and quick communication between support personnel and machine operators; and lack of real time communication between management and machines, both contribute to a decrease in chip cutting time and, thus, productivity.

In an attempt to alleviate the foregoing problems, various types of production monitoring control systems have been proposed by the prior art. Many such systems include an operator input module located at each N/C machine. The modules allow the operators and/or management, maintenance or other personnel to electronically advise a control station of a wide variety of information related to productivity and/or that certain assistance is needed. In accordance with this information, the control station automatically or personnel manually, using pencil and paper methods, record the status of machine operation. In addition, if the operator needs assistance, control station personnel contact the necessary support personnel and direct him (them) to the location of the machine needing assistance.

While production monitoring and control systems of the foregoing nature have assisted in reducing chip cutting time when compared with N/C machine stops having no production monitoring control system, prior art production monitoring control systems have a number of disadvantages. For example, as noted above, the central location personnel, after a call for assistance arrives, must locate the necessary shop personnel. If such personnel, as is often the case, are located in the machine shop area, making contact is often difficult and time consuming. Shop and personnel radio or audio paging device generally do not work satisfactorily, due to shop noise and electromagnetic interference. Hence, in many instances, the desired person or persons must be physically located by the central station operator or an assistant. Because such methods of locating support personnel are time consuming, chip cutting time is reduced.

Another problem with prior art production monitoring control systems is the restricted nature of the types of assistance calls that can be made. In many cases only a handful of different call codes can be produced by an operator's call module. Hence, the operator is restricted as to the type of information he can transmit to the control room, whereby, often a supervisor must first go to the machine to more precisely determine the type of assistance needed, before the assistance can be sought and provided.

Another problem with prior art production monitoring control systems is their use of somewhat sophisticated electrical systems for accurately transmitting data from a shop area to a control station. More specifically, as will be appreciated by those skilled in the N/C machine tool art, electromagnetic interference (EMI) is usually high in large N/C machine manufacturing complexes. The existence of high EMI levels tends to rapidly deteriorate signals passing through non-shielded cables. Thus, simple twisted cable cannot be used, particularly where cable runs are long, without a significant loss of information. In the past, either shielded cables and/or been less electronic circuitry has been utilized to locate signal information contained in the cable noise created by EMI. Obviously, either or both of these solutions are expensive and, thus, undesirable.

Another disadvantage of prior art production monitoring control systems (and also applicable to many other data transmission systems) relates to the power consumed during data transmission. In the past, data has often been transmitted using push-pull current techniques. The problem with current data transmission is that current in the milliampere range is normally required. On the other hand voltage data transmission only requires current in the microampere range, resulting in a power reduction factor of approximately 1000. One of the primary reasons for current data transmission is that, in the past, voltage data transmission has been less noise immune, that current data transmission. Obviously from a power consumption standpoint it is desirable to overcome this disadvantage.

Therefore, it is an object of this invention to provide a new and improved system for enhancing the chip cutting time of N/C machines.

It is also an object of this invention to provide a system that provides for the rapid and accurate transmission of operator assistance requests to the personnel trained to provide the requested assistance.

It is a further object of this invention to provide a new and improved N/C machine monitoring system that provides for the rapid transmission of assistance calls from a machine operator to the individual or individuals trained to provide the desired assistance, even though such individual or individuals are located in areas where they cannot be readily contacted by audio devices.

It is a still further object of this invention to provide a new and improved means for rapidly and accurately transmitting data in a voltage manner over relatively long cables located in an environment wherein a substantial amount of electromagnetic interference exists, without a substantial deterioration of the transmitted data occurring.

It is yet another object of this invention to provide a system for use in an N/C machine tool environment that assists in rapidly providing operator assistance while providing on a real time basis information for use by management.

SUMMARY OF THE INVENTION

In accordance with principles of this invention, an N/C machine paging, status and report system is provided. The system includes an operator input module located at each N/C machine. The input modules allow the operator of the N/C machine, via switches, to control the transmission of digital codes denoting the operators need for assistance and the status of his machine. Requested assistance may comprise CALLS for: raw material, relief, immediate electrical, mechanical or hydraulic maintenance, regular electrical, mechanical or hydraulic maintenance etc. STATUS codes may indicate setup, part handling, absence of operator, machine deactivation, special studies, tape tryout etc. A central processing unit (CPU) located in a control room sequentially interrogates the operator input modules to obtain the digitally coded CALL and STATUS information. Interrogation data, and CALL and STATUS data, is transmitted via twisted cable pairs (that may or may not be shielded) in a voltage controlled push-pull manner. Preferably, such data transmission is controlled using tri-state CMOS (complementary metal oxide semiconductor) technology, whereby common interrogation and data buses can be used.

The CPU uses the CALL information to control the displays of one or more visual paging boards located in the shop region, as necessary. CALL information may also be routed to a maintenance room. The visual paging boards are placed in positions such that at least one board is viewable from all of the aisles and operator stations of the machine tool area. Preferably, the display is a dual numeric display that indicates the nature of the requested assistance and the location of the N/C machine requesting assistance. In this manner, maintenance and other support personnel, in the machine tool area, are rapidly advised of the need for assistance and the location where assistance is needed.

In addition, the CPU uses the STATUS and CALL information to control the displays of a management display board, preferably located in a control room. The management display board displays the CALL and/or STATUS of each machine tool, as determined by the digital code received as a result of interrogating the operator modules. Preferably, the computer also controls a display for each machine that indicates the time period that a particular status has been in effect. Also, preferably, the status display board includes a plurality of colored lights (e.g. light emitting diodes) for each machine. The colored lights allow the entire board to be rapidly, visually scanned to locate which machines are in broad general status states, such as operating, non-operating, down for repair or withdrawn from service, for examples.

In addition to controlling displays, the computer also accumulates various date parameters related to machines operation. In accordance with this data the CPU causes a suitable data terminal (e.g. teletype) and/or data storage system (e.g. punch-tape) to produce reports and/or store report information at predetermined intervals e.g. daily, weekly, monthly or by work shift.

Preferably, rather than updating displays and/or accumulation totals, the computer requires that new CALL or STATUS data exist at an input module for some predetermined number of interrogation cycles prior to recognition, such as three cycles. This time delay between the first acquisition and subsequent use of data allows erroneous digital codes (or the detection of false codes produced during module switch setting) to be ignored.

In addition to the foregoing data, if desired, automatic mode of operation sensors, adapted to sense whether a machine is in an N/C or cutting mode of operation or an override mode of operation are provided. These sensors are interrogated at the same time as the operator modules and the acquired data (which is also in digital form) is used by the computer to control suitable status display board displays, as well as related report sections.

It will be appreciated from the foregoing summary that the invention provides a new system for increasing chip cutting time and, thus, the productivity of N/C machines. The use of push-pull voltage variations to transmit instructions and data between N/C machine operator modules to a CPU, preferably remotely located in a control room, reduces power requirements and eliminates the necessity for the inclusion of sophisticated electronic circuitry to provide for data integrity, when compared to data transmission techniques using current variations. In addition, while coaxial or shielded cables can be used, in most instances, they are unnecessary. The primary beneficial result of the invention (increased chip cutting time), however, is produced by the use of visual paging boards located throughout the N/C machine shop area. These boards allow CALL information to be readily transmitted to support personnel located near the machines, whereby the reaction time between the initiation of a particular assistance call by an operator, and the receipt of the requested assistance, is substantially reduced. Further, the rapid real-time accumulation of routine maintenance requests allow such requests to be readily scheduled in a non-conflicting manner. The real-time accumulation of data also allows reports to be produced regularly and rapidly in an automatic fashion.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 12 is a logic diagram of call and status switches, and line isolators and drivers suitable for use in FIG. 5;

FIG. 13 is a logic diagram of line isolators and drivers suitable for use in FIG. 5 with the mode status sensors;

FIG. 14 is a logic diagram of a flag enabling circuit suitable for use as part of the line isolators and drivers illustrated for use in FIG. 5 to produce data flags from transmission to the CPU;

FIG. 23 is a sybsystem flow diagram detailing the acquisition of data from operator modules;

DESCRIPTION OF THE PREFERRED EMBODIMENT

Figure 1:
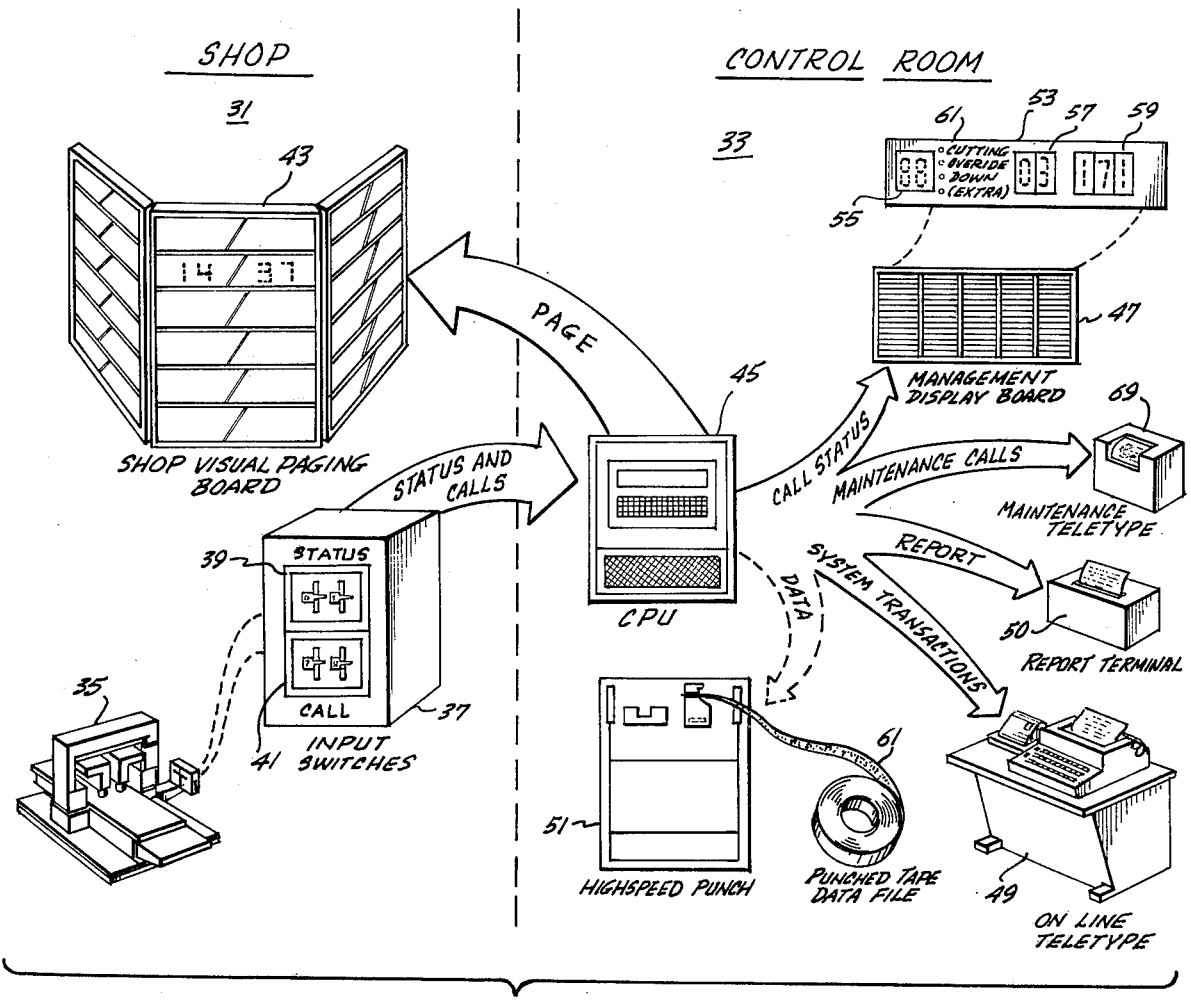
FIG. 1 is a pictorial diagram illustrating an N/C machine paging, status and report system formed in accordance with this invention.

FIG. 1 is pictorial diagram illustrating an N/C machine paging, status and report system formed in accordance with the invention. The system illustrating in FIG. 1 includes two sections remote from one another—a shop section 31, located on the left side of FIG. 1 and a control room section 33, located on the right side. The shop section 31 includes a plurality of operator modules 37, each located adjacent an N/C machine 35. For purposes of clarity only a single N/C machine and operator module are illustrated. Each operator module 37 includes a pair of status switches 39 and a pair of call switches 41, each adapted to control the production of a digital code related to their setting. The shop section 31 also includes one or more shop visual paging boards 43.

The control room section 33 comprises: a CPU or computer 45; a management display board 47; an on-line teletype 49; a report terminal 50; a high speed punch 51; and, a maintenance teletype 69. The on-line teletype 49, report terminal 50, the high speed punch 51 and the maintenance teletype 69 are by way of illustration only. These devices can be replaced by other types of display, printing and/or recording devices and/or systems, as desired.

Figure 2:
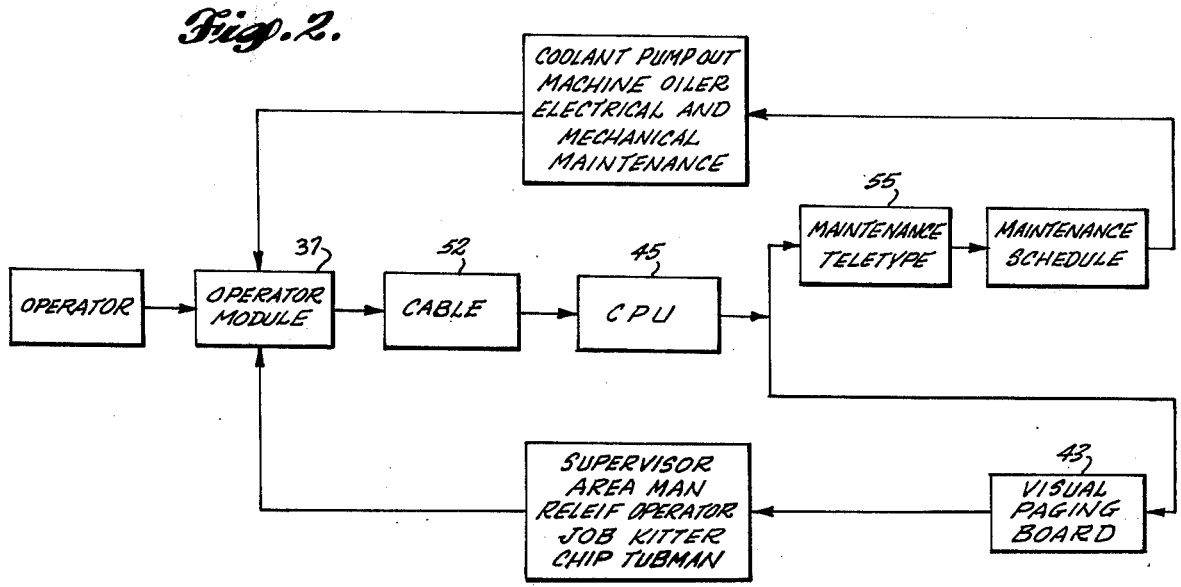
FIG. 2 is a functional block diagram illustrating the operation of the invention with respect to assistance and maintenance CALLS made by a single N/C machine, and the response thereto.

As illustrated in FIG. 2, the operator modules 37 associated with each N/C machine 35 are connected by bus cables 52 to the computer 45. The computer 45 sequentially interrogates each operator module and accumulates data related to the manually adjusted position of the status and call switches. The interrogation sequence also detects the status of sensors (not shown) that denote whether the N/C machine is in an N/C mode, an override mode or a combined mode of operation. In accordance with this "acquired" data, the computer controls visual displays presented by the shop visual paging boards 43 and the management display board 47 and the production of data for printing by the on-line teletype 49, report terminal 50 and/or recording by the high speed punch 51. In addition, if required by a CALL code as hereinafter described, the computer may transmit data to the maintenance teletype 69, which may be located in a maintenance control room.

The shop visual paging boards are controlled such that, when a suitable assistance CALL is made, the boards display, in numeric form, the particular machine that made the CALL, routine maintenance CALL requiring scheduable maintenance, it may not be used to create a display. Rather it may be used to cause the maintenance teletype 69 only to provide an indication that a particular type of maintenance has been requested.

As also illustrated in FIG. 2, the visual paging board displays cause the appropriate support personnel to respond to the call for assistance. Thus, a supervisor, shop area man, relief operator, tool kitter, chip tub man etc. can be called as needed. Calls routed to the maintenance teletype will result in the scheduling of coolant pumpout, machine oiling and routine electrical, mechanical and hydraulic maintenance, and the like, so that such maintenance can be performed without an undue loss in chip cutting time. Thus, it can be seen that, in essence, two function loops are formed using the teachings of the invention. The loops are designed to help machine operators rapidly locate support personnel and receive necessary assistance.

As illustrated by the exploded view 53 of a single section, the management display board 47 includes a plurality of sections. Each section is dedicated to a particular machine identified by an alphanumeric character 55 located on the left side of the section. On the right side of the section are two separate alphanumeric displays. The first display 57 of these two displays denotes the present or real time status of the machine and any associated CALL, determined by the CPU's interrogation of the status switches 39. The second display 59 is a time display denoting the elapsed time since the related machine entered a particular status state (or the duration of a call, as discussed below). In addition, located between the machine identifying alphanumeric character 55 and the status display 57 is a vertical row of lights 61. Each of the vertical lights are a different color and each is adapted to identify a broad general category of operation, such as cutting, override or down. This colored light arrangement allows a person scanning the board to rapidly locate all machines operating in one of the denoted broad general categories. A check of the adjacent status display 57 will thereafter provide the viewer with a more precise indication of the exact status of the machine. In this regard, in addition to denoting status, the status board is designed to display CALL information, as well as status information. More specifically, the status display 57 is designed to display CALL information when a call for assistance is made, either continuously or alternately displaying STATUS and CALL information. At the same time, the time display 59 is controlled to denote the elapsed time since the CALL was first made. In this manner a person viewing the management display board 47 is advised of the need for assistance and, if a response is not made within some "normal" time frame, can take any action necessary to cause a response to be promptly made.

In addition to controlling the paging and status displays, the computer is also programmed to totalize information related to varius parameters of importance to management. For example, the computer may totalize the time each machine is in a cutting status, an override status and a down status during some time frame, e.g., shift, day, week etc. In addition, the computer may totalize the types of calls made by a particular machine during similar or other time frames. This information is used to cause the report terminal 50 to prepare written reports at the end of each such time frame. In addition, or alternatively, the information may be used to drive the high speed punch to create a "report" stored on punch tape 61.

Figure 3:
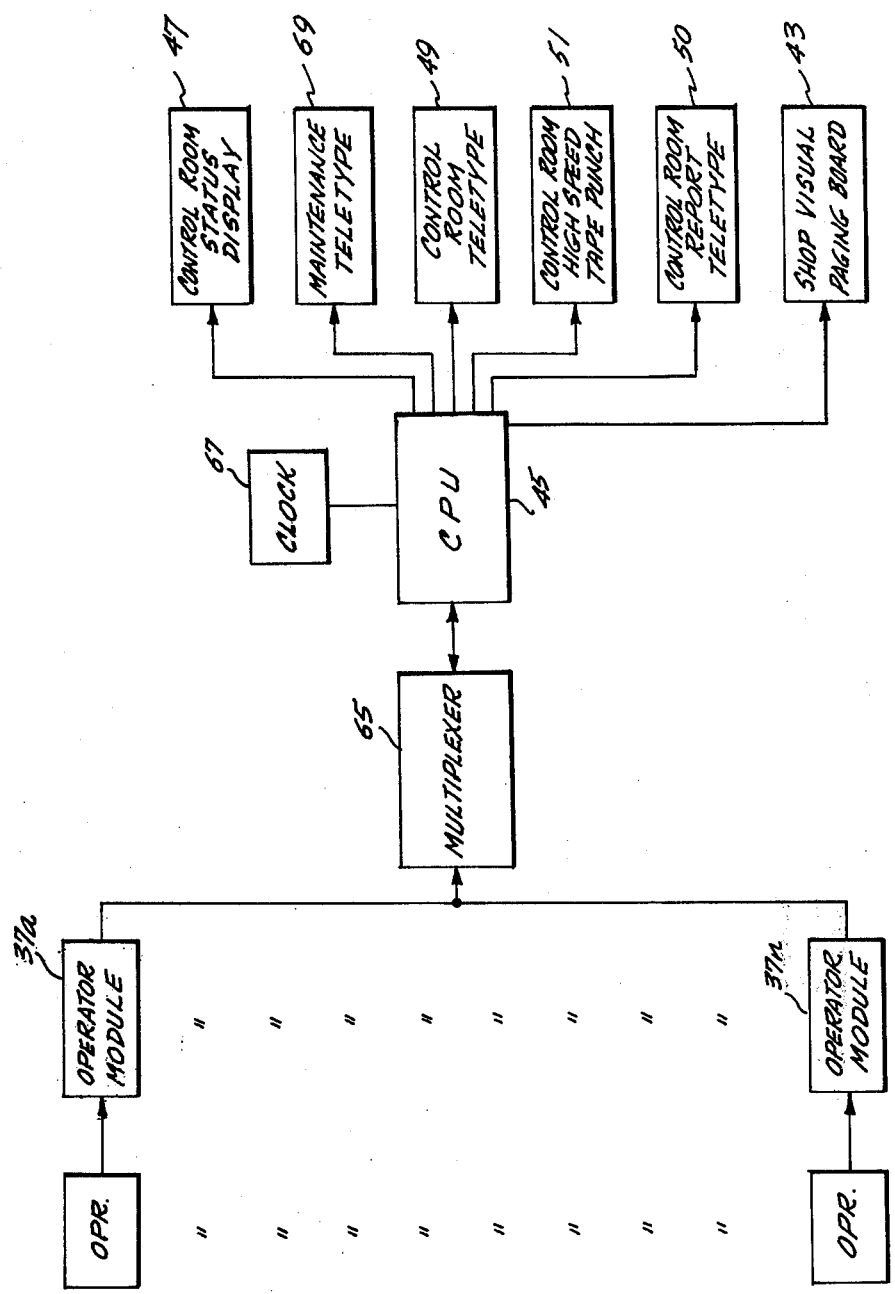
FIG. 3 is a functional block diagram illustrating the flow of data from a plurality of N/C machine operator controlled modules to a CPU (computer) and the control of a variety of display and output devices by the CPU.

FIG. 3 is a generalized functional block diagram illustrating the invention. In FIG. 3, a plurality of operator modules 37a–37n are illustrated as being controllable by a plurality of operators. The operator modules are connected via a muliplexer 65 to the computer 45. The computer is timed by a clock or time base generator 67 and is connected to the control room status display 47; a maintenance teletype 69; an on-line control room teletype 49; a control room high speed tape punch 51; an on-line control room report terminal 50; and, the shop visual paging board 43.

In operation, the operators manually adjust the switches of their related operator module 37 in accordance with the status of their machine and whether or not they need assistance from one of the support type individuals discussed above. The computer 45 sequentially interrogates the operator modules and the multiplexer time multiplexes the resultant data and forwards it to the computer. In accordance with the data it receives, the computer 45 controls the various control room displays, punch tapes and teletypes, the maintenance teletype and the shop visual paging board in the manner described above.

As will be appreciated from viewing FIGS. 1–3 and the foregoing description, the invention is primarily directed to providing a system that decreases the time interval between an operator requesting assistance and the receipt of that assistance. The decrease in this time interval causes a corresponding increase in chip-cutting time; that it, productivity. As a subsidiary benefit, management information is accumulated in real time whereby desired reports can be produced at any desired time interval.

Figure 4:
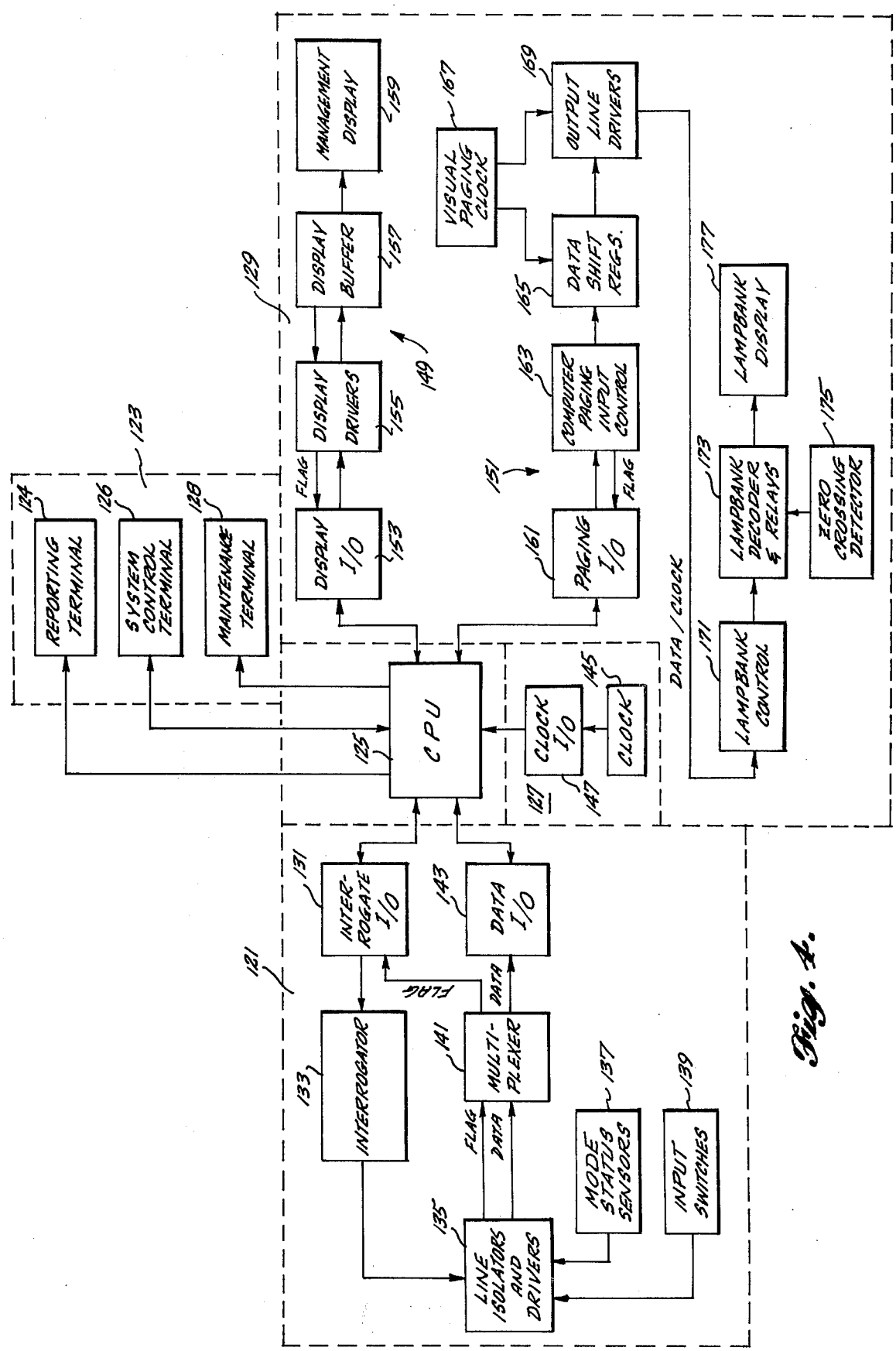
FIG. 4 is a block diagram of an N/C machine paging, status and report system formed in accordance with the invention.

FIG. 4 is a block diagram of a preferred embodiment of the present invention and generally comprises an N/C machine operator input subsystem 121; a control room subsystem 123; a computer 125; a timing subsystem 127; and a display subsystem 129.

The operator subsystem 121 comprises: an interrogate I/O (input/output) 131; an interrogator 133; line isolators and drivers 135; mode status sensors 137; operator module input switches 139; a multiplexer 141; and, a data I/O 143. The computer 125 is connected to the interrogate I/O 131 and to the data I/O 143. The interrogate I/O is connected through the interrogator 133 to the line isolators and drivers 135. The mode status sensors 137, adapted to sense whether or not the machine is in either an N/C mode of operation or an override mode of operation, are connected to the line isolators and drivers 135. Similarly, the operator module input switches 139, which, as noted above, are manually adjusted by the machine operator to provide CALL and/or STATUS data, are also connected to the line isolators and drivers 135. The line isolators and drivers transmit interrogation flags, and CALL, STATUS and MODE data to the multiplexer 141. The multiplexer 141, in turn, transmits to the computer 125 the CALL, STATUS and MODE data via the data I/O 143; and, the flag data via the interrogate I/O 131.

As will be better understood from the foregoing general description, and the following description of certain details, each operator module includes an interrogator 133, line isolators and drivers 135, mode (machine condition) status sensors 137 and input switches 137. The interrogator is adapted to respond to a predetermined interrogate code transmitted by the interrogate I/O and generated by the computer. (This "address" approach allows all interrogators to be bus connected to a single interrogate I/O.) When the appropriate interrogate code is received, the line isolators and drivers transmit data related to the state of the input switches and the mode status sensors. The line isolators and drivers also produce a flag signal for the associated addressed operator module. Both the data signals and the flag signals are multiplexed by the multiplexer and transmitted by the data and interrogate I/Os, respectively to the computer. In this manner, the computer 125 sequentially receives groups of data words, each word being related to the STATUS and CALL states, and mode of operation, of a particular machine.

The control room subsystem 123 comprises: a reporting terminal 124; a system control terminal 126; and, a maintenance terminal 128. The system control terminal comprises the normal man/machine data terminal i.e. a tape reader and/or a keyboard. The maintenance terminal is physically located in a separate maintenance room.

The timing system 127 comprises a system clock 145 and a clock I/O 147. The clock 145 generates clock pulses that are applied to the computer 125 via the clock I/O. As will be readily appreciated by those skilled in the art, the clock 145 provides timing for overall system operation.

The display subsystem 129 comprises a control room section 149 and a shop paging section 151. The control room section 149 includes: a display I/O 153; display drivers 155; a display buffer 157; and a management display 159. The display I/O 153 is connected to the computer 125 and receives display information. The display information is applied to the display buffer 157 via the display drivers 155. The display buffer 157 is a buffer memory that, upon the receipt and storage of suitable display data, generates a flag signal. The flag signal is returned to the computer 125 via the display drivers 155 and the display I/O 153. The display buffer 157 is connected to the management display 159. As previously discussed, the management display includes a display board of the type illustrated in FIG. 1 that displays STATUS and, if present, alternately the CALL information for each and every N/C machine monitored by the invention.

The paging display section 151 comprises: a paging I/O 161; a computer paging input control 163; data shift registers 165; a visual paging clock 167; output line drivers 169; a lampbank control 171; a lampbank decoder and relay circuit 173; zero crossing detectors 175; and, a lampbank display 177. The lampbank display forms the alphanumeric display displayed by the shop visual paging boards.

The computer paging input control 163 is connected to the computer 125 via the paging I/O 161. In general, the computer provides instructions regarding the nature and location of a plurality of rows of shop visual paging board displays. Preferably, each display row includes one, two or more character positions used for machine identification, followed by one, two or more character positions used to denote the particular CALL being made. Preferably these two row "sections" are separated by a suitable symbol, such as a slash, that may form part of the housing structure. Thus, support personnel viewing the board are advised when their assistance is being sought, and the location of the machine requesting assistance.

The computer paging input control 163 controls the flow of display control data to the data shift registers 165 and produces a flag when such data is received and temporarily stored by the data shift registers 165. The data stored in the data shift registers 165, in turn, is outputed under the control the visual paging clock 167 via the output line drivers 169. The output line drivers are connected to the lampbank control 171. The lampbank control receives the stored data and, in accordance therewith, controls the lampbank decoder and relay circuit 173. The lampbank decoder and relay circuit 173 includes a decoder that decodes incoming data and sets latches in accordance therewith. The latches, in turn control the application of power (preferably, three phase AC power) to the lamps forming the lampbank display 177. The zero crossing detectors 175 detect the approach of the zero crossing points of the A/C power and control the latch activation or closure of the relays such the relay contacts close at the zero voltage crossing point. It will be appreciated that the inclusion of zero voltage crossing detectors 175 to control the flow of relay closing data to the relays reduces to a minimum relay contact arcing, and the resultant destruction of such contacts caused by arcing.

Figure 9:
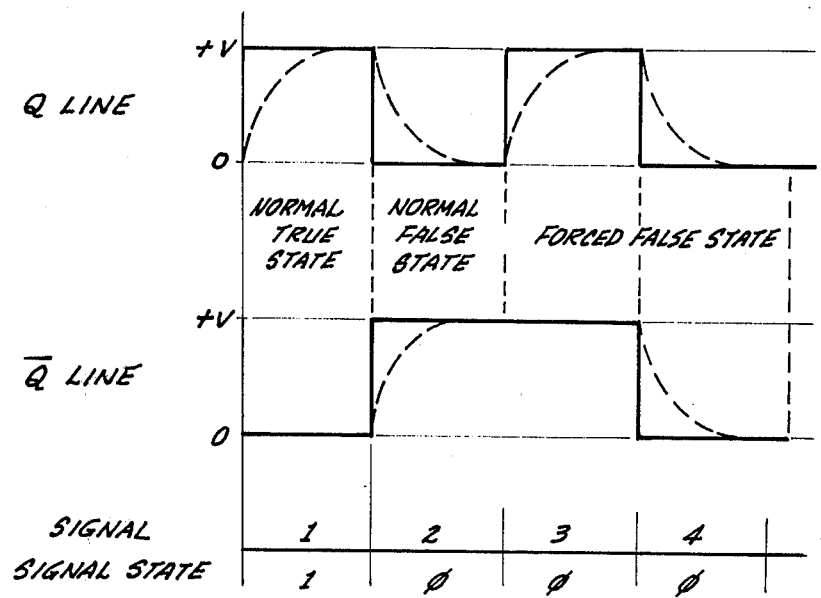
FIG. 9 is a timing diagram illustrating the configuration of push-pull voltage signals created and utilized by the invention to transmit interrogate and data information between the N/C machine shop area and the CPU.

Prior to describing the preferred form of the main subsystems forming the system illustrated in FIG. 4, and the preferred form of the logic making up some of those subsystemes, a brief discussion of how data is transmitted between the computer and the subsystems located in the shop area, i.e., the operator subsystem 121 and, if desired, the shop paging section 151 of the display subsystem 129, is presented. As briefly noted above, data (machine CALL, STATUS and mode of operation) is transmitted to the computer from the N/C machine locations in a voltage push-pull manner. (If desired, interrogate and display commands may also be transmitted in this manner). The voltage push-pull nature of the data (and command) signals is illustrated in FIG. 9. The solid lines denote the idealized nature of the signals and the dashed lines denote, in more realistic form, the nature of the signals. Basically, the push-pull signals are transmitted along two related wires, which may be formed by an unshielded, twisted pair of wires. Normally, one wire (the Q line) of this "data cable" carries binary information in one form and the other wire (the $\overline{Q}$ line) carries binary information in complementary form. A binary one (the normal true state) exists when the Q line is in a plus voltage state with respect to ground and, simultaneously, the $\overline{Q}$ line is at ground. A binary zero (the normal false state) exists when the Q line is at ground and the $\overline{Q}$ line is in a plus voltage state. All other conditions (i.e., when both Q and $\overline{Q}$ are in plus voltage states or both are at ground) are construed to be forced false states. Forced false states are recognized as zeros, as will be better understood from the following description.

The invention uses newly introduced CMOS (complementary metal oxide semi-conductors) technology to obtain high input electromagnetic noise immunity and extremely low power consumption, without loss of information. It is this technology that allows voltage push-pull states to be used to transmit data, as opposed to using current push-pull states. More specifically, as will be appreciated by those skilled in the data transmission art, in the past, push-pull data usually has been transmitted by controlling current flow, particularly in areas of high electromagnetic interference. The problem with current data transmission systems, as opposed to voltage data transmission systems, is that current systems usually draw current in the milliampere range while voltage systems draw current in the microampere range. CMOS technology overcomes this problem because switches using this technology inherently require that an input voltage be above a predetermined level before a switch changes state. All lower voltage signals do not pass i.e. do not cause a switch state change. Thus, CMOS devices have high electromagnetic immunity. Moreover, because they sense voltage changes, rather than current changes, their current draw (which is directly related to the power consumption) is low.

CMOS devices have a further advantage. Specifically, CMOS bilateral switches are tri-state devices. They can be held high, low or floating. When an enable signal is applied to such a switch, its voltage output is a reflection of its voltage input (assuming the input is above a predetermined level, as discussed above). When no enable signal is applied to the control input of a CMOS bilateral switch, its output floats. Thus, the inclusion of CMOS bilateral switches allows a bus technique to be utilized to transmit commands from the computer and data to the computer. The end result is that a low power consumption, minimal wire system is provided by the invention.

Figure 5:
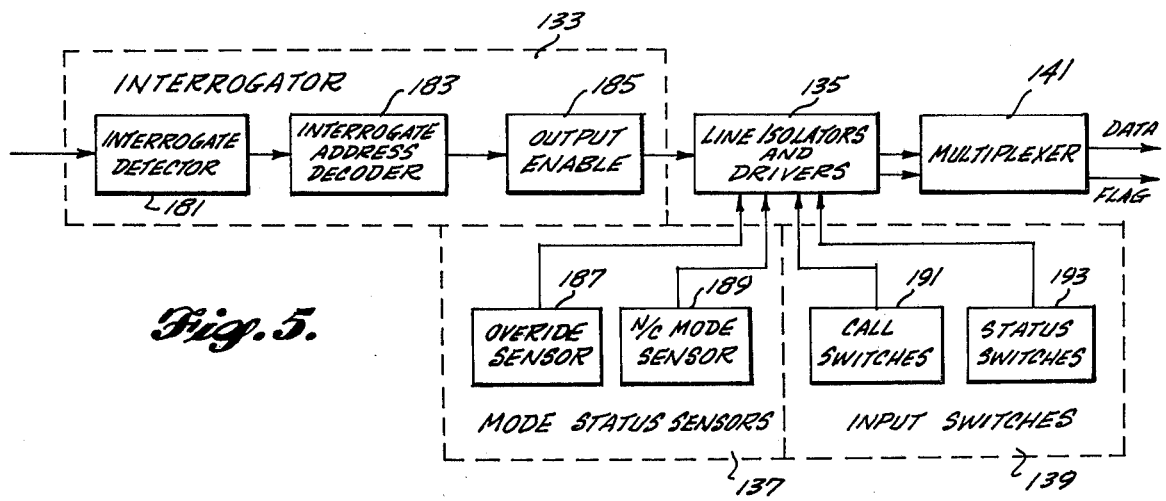
FIG. 5 is a subsystem block diagram of an interrogator, mode status sensors and input switches suitable for use in the system illustrated in FIG. 4.

Turning now to a more detail description of the subsystems of the system illustrated in FIG. 4 and, the preferred form of the logic used to perform certain of the functions of these subsystems; FIG. 5 illustrates the portion of FIG. 4 comprising the interrogator 133; the mode status sensors 137; the input switches 139; the line isolators and drivers 135; and, the multiplexer 141. The interrogator 133 comprises: an interrogator detector 181; an interrogate address decoder 183; and an output enable circuit 185. The interrogate detector 181, detects the receipt of voltage push-pull interrogate commands generated by the computer. When the appropriate interrogate command is sensed, the interrogate address decoder 183 decodes it and applies an enable signal to the output enable circuit 185. In accordance therewith, the output enable circuit enables the line isolators and drivers 135.

The mode status sensors 137 include an override mode sensor 187 and an N/C mode sensor 189. These sensors produce data related to the mode of operation of the machine. More specifically, if the machine is in a normal N/C mode of operation, the N/C mode sensor 189 produces data indicating such a condition. Contrawise, if the machine is operating in an override mode of operation, i.e., the automatic N/C mode of operation is being overridden by the operator, the override mode sensor 187 produces data denoting this mode of operation. If it is possible for both conditions, i.e., N/C mode and override mode, to exist, as with some N/C machines, these two sensors will indicate this set of conditions. The data produced by the mode status sensors 137 is applied to the line isolators and drivers 135.

The input switches 139 include call switches 191 and status switches 193. As will be better understood from the following description, preferably, the call switches and the status switches each comprise two switches that may be set to produce a binary code repressing some alphanumeric value. One switch may represent unit values and the other tens values. The unit values may be in binary coded decimal (BCD) form and the ten values may be in binary coded octal (BCO) form. The preferred form of the invention, herein described, uses this coding for both the call and the status switches.

The call switches and status switches are also connected to the line isolators and drivers 135. When enabled, the line isolators and drivers 135 transmit all of their input data (CALL, STATUS and mode of operation) to the multiplexer 141 in voltage push-pull form. The multiplexer in turn, transmits this data to the computer 125 via the data I/O.

Figure 10:
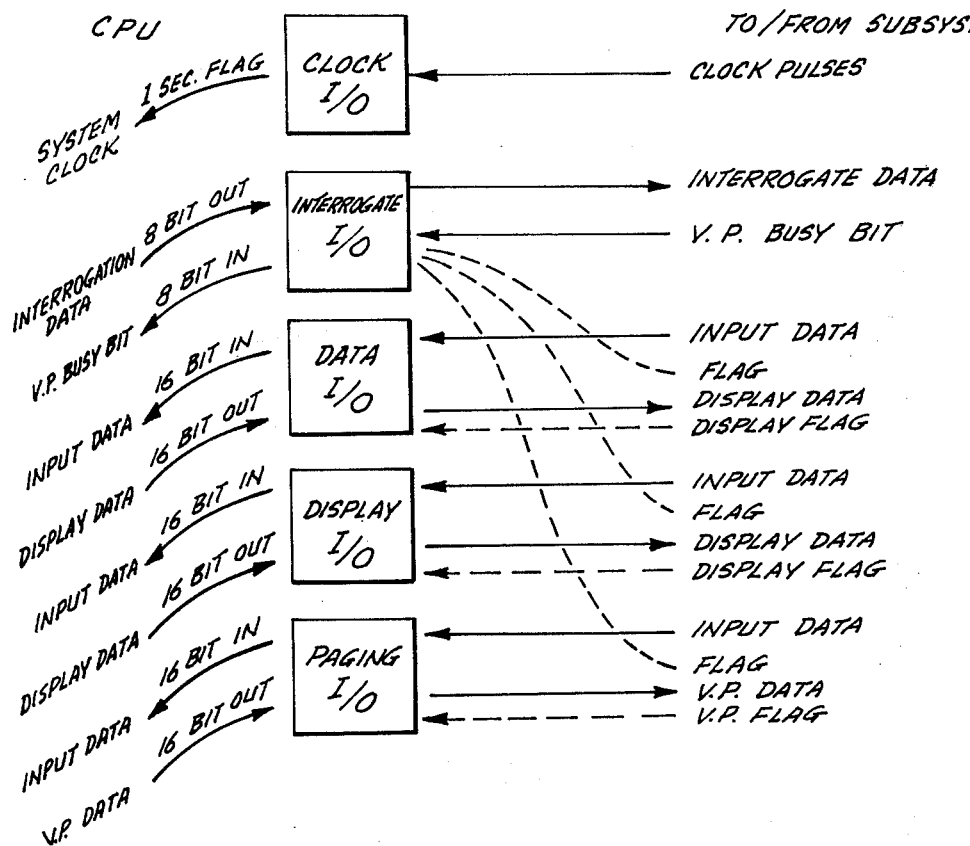
FIG. 10 is a block diagram illustrating the various input/output (I/O) devices of the invention which control the flow of information between the CPU and the various peripheral subsystems connected thereto.

It will be appreciated that modern CPUs (computers) can manipulate data much faster than the machines can be interrogated and produce data using CMOS technology. Similarly, it will be appreciated that the display I/O, the interrogate I/O, and the paging I/O while bi-directional devices, to the extent discussed above, are only used to transmit data from the computer to their related subsystems. Because of this situation, as illustrated in FIG. 10, the invention utilizes the display and paging I/Os to transmit data to the computer, as well as the data I/O. More specifically, because the system I/O's are bi-directional or duplex, each I/O is capable of performing input and output operations, but not simultaneously. Each I/0, except the clock I/O, services two subsystems of the total system. For example, while the interrogator I/O primarily serves to forward interrogation data to the operator subsystems 121, it also inputs a visual paging busy bit to the CPU. The data and display I/O's forward operator module data to the CPU and real time display data from the CPU. The paging I/O forwards operator module data to the CPU and visual paging data from the CPU. This partitioning or distribution of functional operation between the I/O's optimizes overall system performance. Each of the three "operator module data I/O'" may, for example, denote a particular "shop area" serviced by the system.

In addition, it will be recognized that conventional I/Os are usually of an 8-bit or 16-bit nature. In the preferred form of the invention, interrogate signals are 8-bit in nature and data, whether it be machine state information data, or display or paging command data, is 16-bit in nature. Since the machine data is 16-bit in nature, and since the data, display and paging I/Os are 16-bit in nature, flags denoting the receipt of interrogation commands, simultaneously produced with machine data cannot pass through these I/Os simultaneously. Since the request for operator module data originates from the interrogate I/O, the associated flag is returned directly to the requesting or interrogate I/O, as generally illustrated in FIG. 4, rather than being delayed and passed through data, display and paging I/Os.

Figure 11:
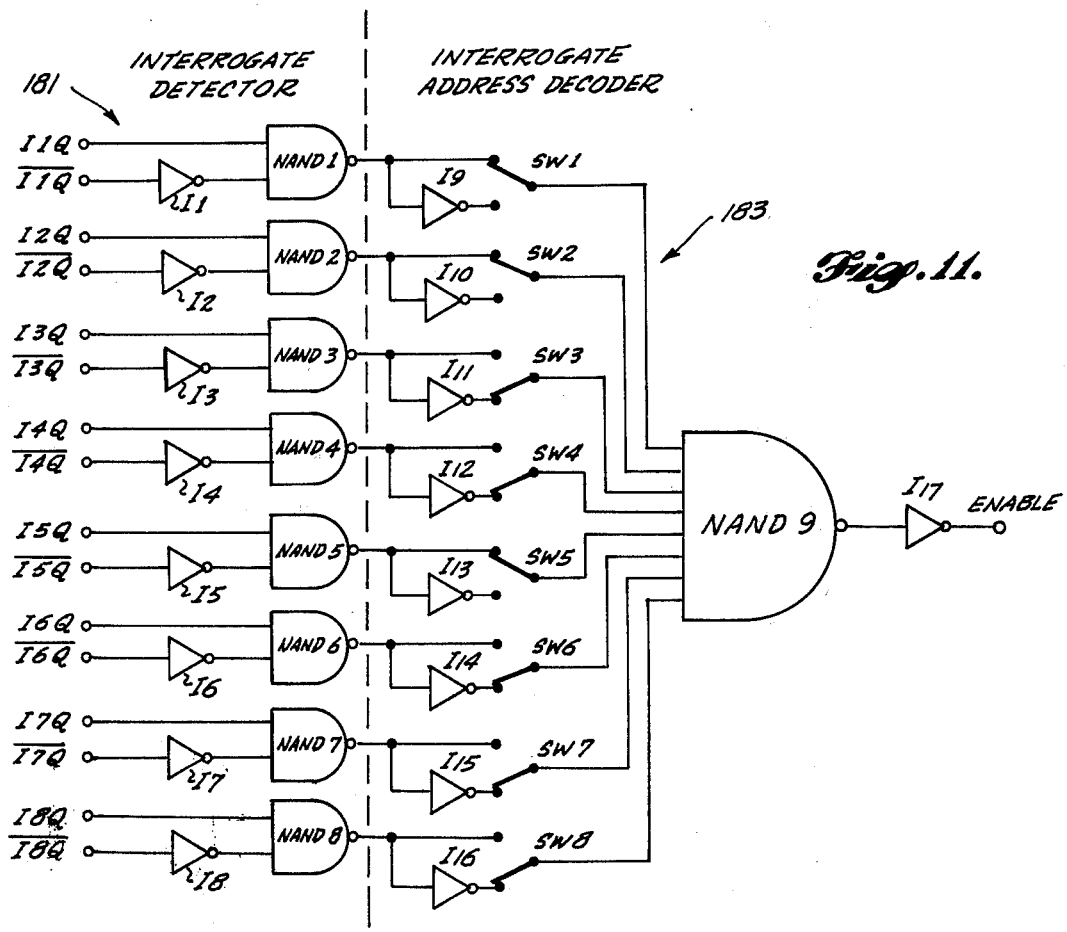
FIG. 11 is a logic diagram of an interrogate decoder and an interrogate address decoder suitable for use in the interrogator illustrated in FIG. 5.

FIG. 11 is a logic diagram illustrating a preferred form of an interrogate detector 181 and an interrogate address decoder 183. Each interrogate detector comprises: eight inverters designated I1–I8; and eight two-input NAND gates designated NAND1–NAND8. The eight bits of parallel interrogate data (which are illustrated in voltage push-pull form, as discussed above) are designated I1Q, $\overline{I1Q}$–I8Q, $\overline{I8Q}$. I1Q is applied to one input of NAND1 and $\overline{I1Q}$ is applied through I1 to the second input of NAND1. Similarly, I2Q and $\overline{I2Q}$–I8Q, $\overline{I8Q}$ are applied to NAND2–NAND8 either directly or through I2–I8, as the case may be. It will be appreciated that with this arrangement, a true or one state (FIG. 9) of complementary, push-pull inputs create a zero on the output of the related NAND gate. Any other condition, i.e., a normal false state (zero) or a forced false state create a one on the output of the related NAND gate.

Each interrogate address decoder 183 includes nine inverters designated I9–I17; eight single pole, double throw switches designated SW1–SW8; and, an eight-input NAND gate designated NAND9. The output of NAND1 is directly connected to one of the remote terminals of SW1 and through I9 to the other remote terminal of SW1. Similarly, the outputs of NAND-2–NAND8 are connected respectively either directly or through inverters to the remote terminals of SW2–SW8. The common terminals of SW1–SW8 are each connected to one of the eight inputs of NAND9. The output of NAND9 is connected to the input of I17. The output of I17 is a signal designated ENABLE.

As will be readily appreciated by those skilled in the data processing art, the setting of SW1–SW8, which, preferably, is manually accomplished, determines the code that is decoded by the interrogate address decoder. When the I1Q, $\overline{I1Q}$–I8Q, $\overline{I8Q}$ signals are in appropriate code states, simultaneously, the common terminals of SW–SW8 will all be in binary one states whereby a binary zero will be produced on the output of NAND9. This zero is inverted by I17, whereby the ENABLE signal is placed in a binary one state. Any other code state of I1Q, $\overline{I1Q}$–I8Q, $\overline{I8Q}$ causes the signal on the common terminal of one or more of SW1–SW8 to be in a binary zero state, whereby the output of NAND9 is in a binary one state and the ENABLE signal is in a binary zero state. In this manner, the I1Q, $\overline{I1Q}$–I8Q, $\overline{I8Q}$ signals are decoded by the interrogate address decoder 183. Only one unique coded address will be detected.

FIGS. 12, 13 and 14 illustrate line isolators and drivers 135 suitable for use by the invention. FIG. 12 illustrates line isolators and drivers suitable for transmitting either call or status switch information; and, also illustrates the switches in schematic form. FIG. 13 illustrates line isolators and drivers for transmitting override sensor and N/C mode sensor information. And, FIG. 14 illustrates a line isolator and driver for transmitting flag information.

In FIG. 12, the status (or call) switches are illustrated on the left side. The unit switches are illustrated in the upper portion of the figure and the ten switches are illustrated in the lower portion of the figure. The switches are conventional in the sense that the upper set of switches produce binary coded decimal (BCD) data and the lower set of switches produce binary coded octal (BCO) data. In this regard, the unit switch includes four single pole, double throw switches designated SW9–SW12 and the tens switches include three single pole, double throw switches designated SW13–SW15. The units or tens switches are controlled by the operator such that when particular digits are displayed, the switches are in either a binary coded decimal or binary coded octal position, as the case may be, related to the set position. The common terminals of SW9–SW12 are connected to ground, as are the common terminals of SW13–SW15.

The line isolator and driver portion of FIG. 12 comprises fourteen pull-up resistors designated R1–R14; eleven inverters designated I18–I28; and, fourteen CMOS bilateral switches designated G1–G14. Each of the remote terminals of the unit switches, SW9–SW12 is connected, through one of R1–R8 to a voltage source designated VDD. In addition, the common terminals are each connected through a related inverter, I18–I25, to the input of a related CMOS bilateral switch, G1–G8. The output of the CMOS switch, G1 and G2, thusly related to Sw9, are designated D1Q, $\overline{D1Q}$, respectively. Similarly, the outputs of the CMOS switches related to Sw10–SW12 are designated $\overline{D2Q}$, D2Q–D4Q, $\overline{D4Q}$, respectively.

The upper remote terminal of the tens switches illustrated in FIG. 12 are also connected each through a pull-up resistor, R9–R11, to VDD. The lower remote termials of SW13–SW15 are unconnected.

The upper remote terminals of SW13–SW15 are also each connected through a resistor, R12–R14 to the input of a related CMOS bilateral switches, G9, G11 and G13. Further, the upper remote terminals of SW13–SW15 are each connected to the input of related inverters, I26, I27 and I28. The outputs of the inverters are each connected to the input of a CMOS bilateral switches, G10, G12 and G14. The outputs of G9 and G10 are designated D5Q, and $\overline{D5Q}$, respectively. The outputs of G11 and G12 are designated D6Q and $\overline{D6Q}$, respectively. Similarly, the outputs of G13 and G14 are designated D7Q and $\overline{D7Q}$, respectively.

The control inputs of all of the bilateral switches, G1–G14 are connected to the ENABLE output of the interrogate address decoder 183 illustrated in FIG. 11. Thus, when ENABLE shifts to a binary one state, all of the bilateral switches are adapted to shift their outputs to the state of their inputs. Since their inputs are related to the states of SW9–SW15, the outputs D1Q, $\overline{D1Q}$–D7Q, $\overline{D7Q}$, denote in push-pull voltage form the state of SW9–SW15.

It will be appreciated that, as noted above, a logic circuit of the type illustrated in FIG. 12 is provided for both the status switches 193 and the call switches 191. Thus, fourteen sets of push-pull data are formed for each set of operator controlled input switches. For purposes of discussion, D1Q, $\overline{D1Q}$–D7Q, $\overline{D7Q}$ denote the state of the call switches and D8Q, $\overline{D8Q}$–D14Q, $\overline{D14Q}$ denote the state of the status switches.

FIG. 13 is a logic diagram of line isolators and drivers suitable for enabling N/C and override mode sensor information to the multiplexer. The logic circuit illustrated in FIG. 13 comprises: four inverters designated I29–I32; two pull-up resistors designated R15 and R16; and, four bilateral CMOS switches designated G15–G18. The binary data (zero or one) denoting the status of the N/C mode sensor is applied through I29 to the input of G15. The output of I29 is also connected through R15 to VDD and through I30 to the input of G16. The output of the override mode sensor is applied through I31 to the input of G17. The output of I31 is also applied through R16 to VDD and through I32 to the input of G18. The control inputs of G15–G18 are connected to receive the ENABLE output of the interrogate address decoder illustrated in FIG. 11. The output of G15 is designated D16Q, the output of G16 is designated $\overline{D16Q}$. The output of G17 is designated $\overline{D15Q}$ and the output of G18 is designated D15Q. Thus, the outputs of G15 and G16 designate, in push-pull form, the state of the N/C mode sensor when G15 and G16 are enabled, by ENABLE shifting to a binary one state. Similarly, the output of G17 and G18 denote, in push-pull form, the state of the override mode sensor when G17 and G18 are enabled. Since the enabling of G15–G18 occurs simultaneously with the enabling of G1–G14, the D15Q, $\overline{D15Q}$ and D16Q, $\overline{D16Q}$ information is transmitted to the multiplexer at the same time as D1Q, $\overline{D1Q}$–D14Q, $\overline{D14Q}$ information is transmitted.

As illustrated in FIG. 4, a flag is generated by the line isolators and drivers to denote that a transmitted address has been decoded and that the forthcoming data is from the machine whose data is desired. A logic circuit suitable for generating such a flag is illustrated in FIG. 14 and comprises: two resistors R17 and R18; and, two CMOS bilateral switches designated G19 and G20. The input of G19 is connected through R17 to ground. The input of G20 is connected through R18 to VDD. The control inputs of G19 and G20 are connected to receive the ENABLE output of the interrogate address decoder 183 illustrated in FIG. 11. The output of G19 is designated $\overline{FQ}$ and the output of G20 is designated FQ. It will be appreciated that this circuit, when ENABLE shifts to a binary one state places FQ and $\overline{FQ}$ in opposite binary, i.e. push-pull, states. Thus, a push-pull flag signal denoting the receipt and decoding of the appropriate interrogate code is produced for each machine as it is interrogated. The data lines are normally held in false state by the multiplexer.

It will be appreciated from the foregoing description that a plurality of common interrogate and data lines connect, in bus (parallel) form, a plurality of N/C machine modules to the computer. When a predetermined address code is placed on the interrogate bus, a particular N/C machine module is interrogated. Upon the receipt of its address code, the status and call switches of the related N/C machine module are interrogated by enabling CMOS bilateral switches. The resultant STATUS and CALL data is transmitted in parallel to the computer. At the same time, data related to the mode of operation (N/C or override) of the machine is transmitted to the computer. Further, a flag, generated by the particular N/C machine module indicating that the module has been appropriately addressed is transmitted to the computer. If desired, as noted above, a plurality of such parallel "party" lines or buses can be utilized. All such buses may be interrogated simultaneously with the same codes, with each bus being separately multiplexed to the computer. In such a case, the computer would be programmed to sequentially look at the specific bus which information has been requested from during a "data receive" subcycle of operation. Alternatively, each N/C machine module may respond to a unique code.

Figure 6:
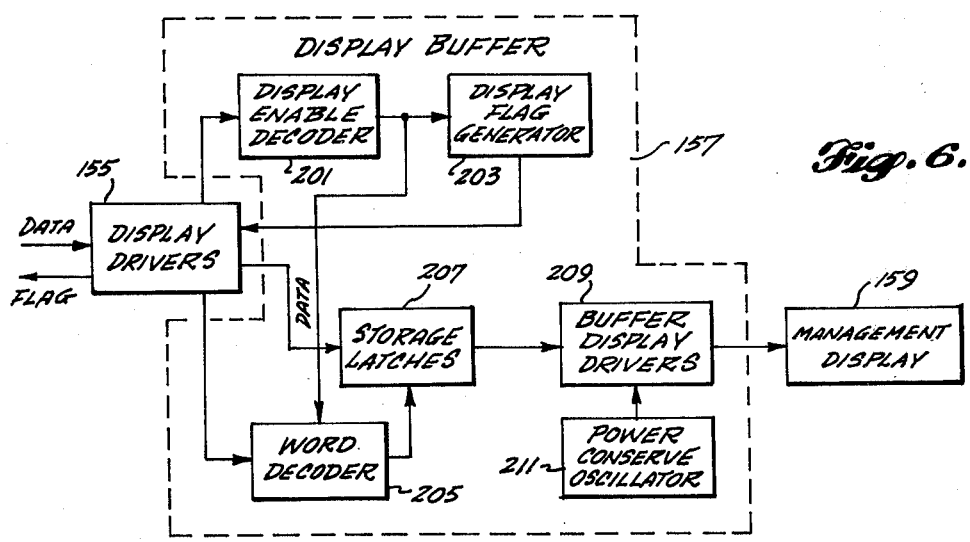
FIG. 6 is a subsystem block diagram of a display buffer suitable for use in the system illustrated in FIG. 4.
Figure 7:
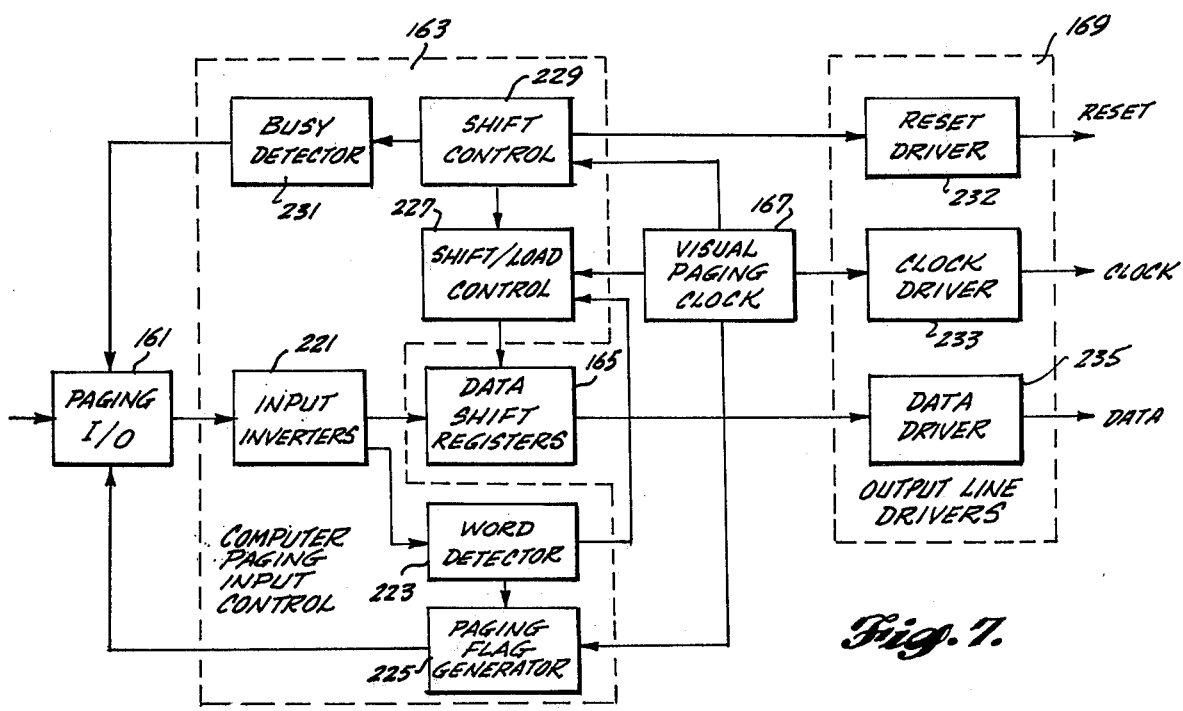
FIG. 7 is a subsystem block diagram of a computer paging input control and output line drivers suitable for use in the system illustrated in FIG. 4.

As illustrated in FIG. 6, the display buffer of the control room section 14 of the display subsystem 129 comprises: a display enable decoder 201; a display flag generator 203; a word decoder 205; storage latches 207; buffer display drivers 209; and, a power conserve oscillator 211. A display buffer of this general type is provided for each of the individual displays 53 illustrated in FIG. 1, except that certain items, particularly the power conserve oscillator, may be common to several individual displays. Each of the display buffers is addressable by the computer and, when addressed, is adapted to receive and store data commands adapted to control the particular display being addressed. More specifically, as illustrated in FIG. 6, the display drivers 155 (which are connected to receive display commands from the computer via the display I/O and transmit flags thereto as discussed above with respect to FIG. 4) are connected to apply command address data to the display enable decoders 201. When suitably addressed, each display enable decoder enables its related word decoder 205. The word decoders 205 receive word identification data from the display drivers 155. The word identification data designates which word of several data words is being received. Word identification display address and display data is sent simultaneously in each data word. The word decoder 205 controls the storage latches such that display commands, applied to the storage latches by the display drivers 155, are stored in the appropriate latches. The stored display commands are applied to the management display 159 by the buffer display drivers 209, under the control of the power conserve oscillator. The power conserve oscillator 211 is adapted to conserve power utilized by the display drivers 209 in the manner hereinafter described.

Figure 15:
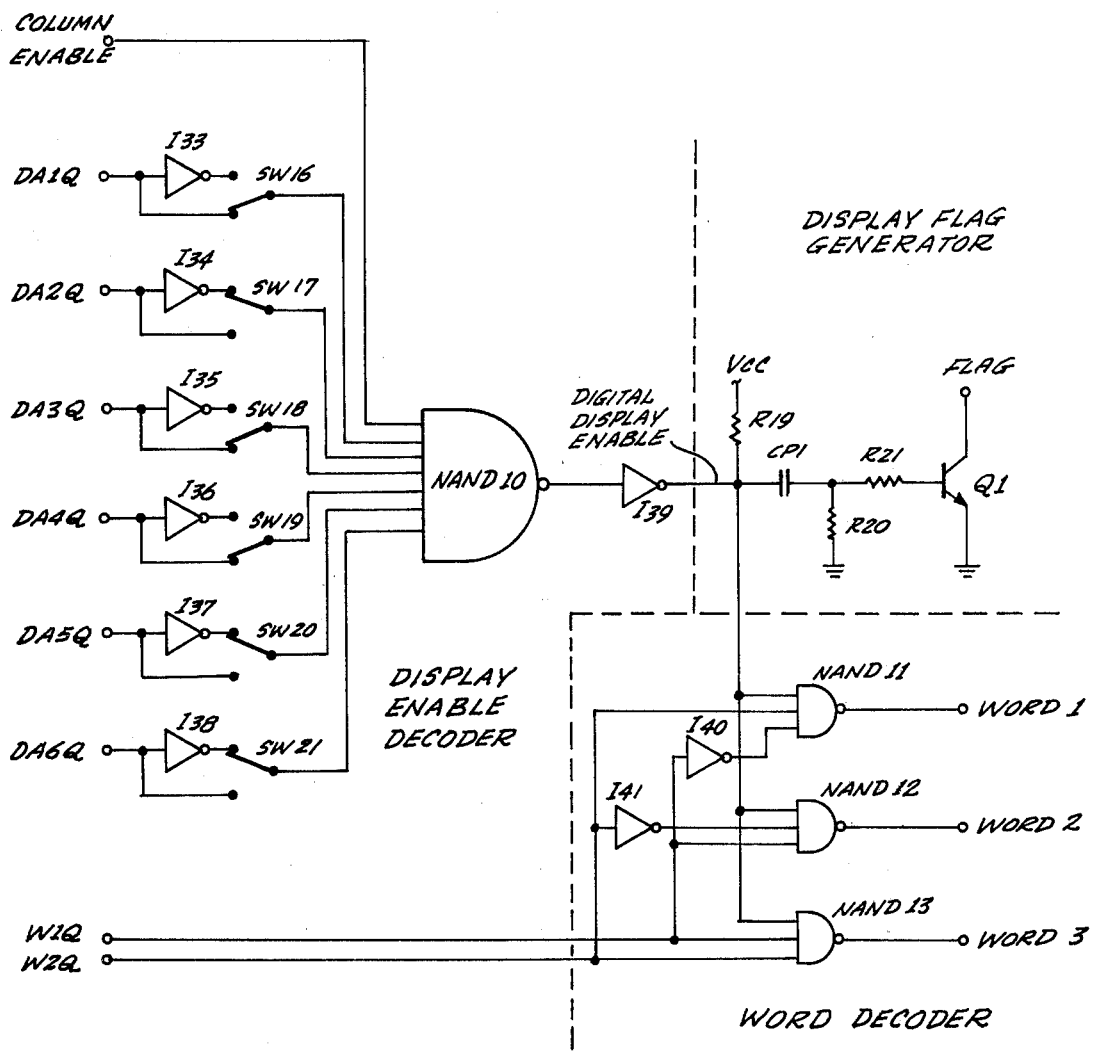
FIG. 15 is a logic diagram of a display enable decoder, a display flag generator and a word decoder suitable for use in the display buffer illustrated in FIG. 6.
Figure 16:
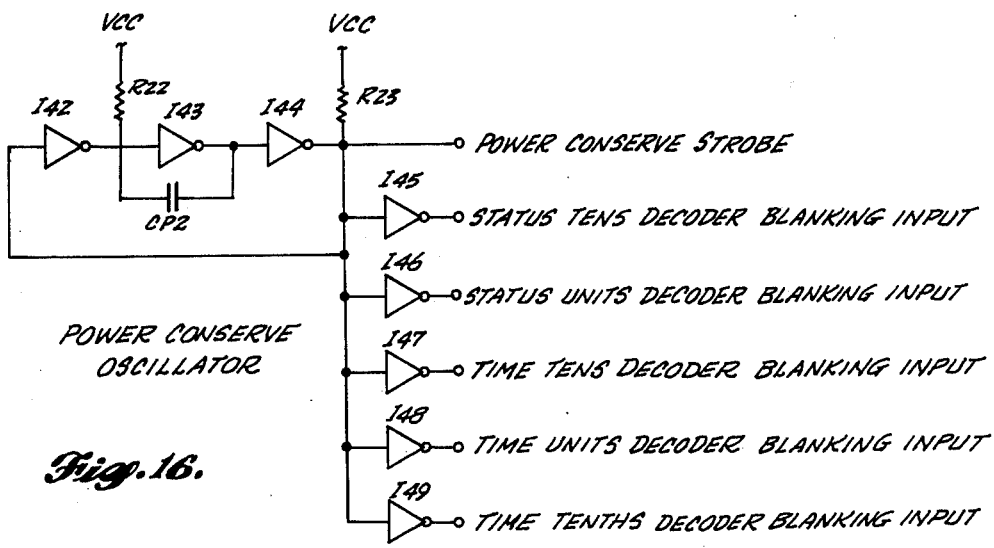
FIG. 16 is a logic diagram of a power conserve oscillator suitable for use in the display buffer illustrated in FIG. 6.

A preferred form of the display enable decoder, display flag generator and word decoder is illustrated in FIG. 15. FIG. 16 illustrates a preferred embodiment of a power conserve oscillator.

The display enable decoder illustrated in FIG. 15 comprises: seven inverters designated I33–I39; six single pole, double throw switches designated SW16–SW21; and, a seven input NAND gate designated NAND10. The display enable decoder receives, in parallel, command address data from the display drivers 155. The command address data is arranged such that only a unique display buffer in enabled. Command address signals DA1Q, DA2Q, DA3Q . . . DA6Q are applied directly to one input of NAND10 and are adapted to enable a particular display buffer of the plurality of displays in the row/column management display 47 illustrated in FIG. 41. Since the management display is local to the computer and, thus, in an area of low EMI noise of COLUMN ENABLE or DA1Q–DA6Q are not in a push-pull form.

DA1Q is applied to one input of I33 and directly to one of the remote terminals of SW16. The output of I33 is connected to the other remote terminal of SW16. Similarly, DA2Q–DA6Q are applied through I34–I38 to one each of the remote terminals of SW17 – SW21 respectively, and, directly to the other remote terminals of SW17 – SW21. The common terminals of SW16–SW21 are applied to the remaining six inputs of NAND10. The output of NAND10 is connected to the input of I39 and the output of I39 is a signal designated DIGITAL DISPLAY ENABLE. It will readily be appreciated by those skilled in the art that the positioning of the SW16 – SW21 switch contacts determines the nature of the DA1Q–DA6Q code necessary to cause DIGITAL DISPLAY ENABLE to achieve a binary one state. That is, when all of DA1Q–DA6Q and COLUMN ENABLE are in appropriate binary states, the output of NAND10 achieves a binary zero state; and, the output of I39 achieves a binary one state. Thus, DIGITAL DISPLAY ENABLE achieves a binary one or enable state.

The display flag generator illustrated in FIG. 15 comprises: three resistors designated R19, R20 and R21; a capacitor designated CP1; and, an NPN transistor designated Q1. DIGITAL DISPLAY ENABLE is applied through CP1 in series with R21 to the base of Q1. The junction between I39 and CP1 is connected through R19 to a voltage source designated VCC. The junction between CP1 and R21 is connected through R20 to ground. The emitter of Q1 is connected to ground. The flag signal is formed on the collector of Q1. In essence, when DIGITAL DISPLAY ENABLE signal achieves a WORD1 register (and from the WORD 2 register into the WORD1 data register and then out), by the shift pulses applied to the clock inputs of the WORD1 and WORD2 data registers via the respective NOR gates (NOR3 and NOR4) and their output inverters (I58 and I61). At this time both W1 and W2 are in binary zero states whereby the one state of the outputs of I56 and I59 place the WORD1, and WORD2 data registers in a shift, as opposed to a load, mode of operation.

The paging flag generator 225 comprises: two inverters designated I62 and I63; a JK flip-flop designated FF1; a two-input NOR gate designated NOR5; four resistors designated R28 – R31; a NPN transistor designated Q2; and, a capacitor designated CP4. W1 is applied to one input of NOR5. W2 is applied directly to the J input of FF1 and through I62 to the K input of FF1. The clock output of the visual paging clock 167 is applied to the clock input of FF1. The Q output of FF1 is connected to the second input of NOR5. The output of NOR5 is connected through R28 to the base of Q2 and through R29 to ground. The emitter of Q2 is connected ground. The collector of Q2 is connected through R30 to VCC, through R31 to the input of I63 and through CP4 to ground. The paging flag is formed on the output of I63.

In operation, paging flag is generated for each of the two computer words. The shift of W1 to a binary one state causes the output of NOR5 to turn Q5 off and produce a flag—the Q output of FF1 being in a binary zero state when the shift of W1 to a binary one state occurs. This signal transition is delayed by R29 and CP4 to insure that the WORD1 data is latched into the WORD1 data register 251 before the flag signal is generated. I63 provides drive to signal the paging I/O that data transfer has been completed. The shift of W2 to a binary one state causes FF1 to change states (i.e., shifts to a binary one state and $\overline{Q}$ shifts to a binary zero state) on the next low going paging clock pulse. Thereafter, a W2 paging flag is generated in the same manner as a W1 paging flag. The time delay arrangement insures that visual paging is brought into synchronization with the computer (i.e., commands are received and stored) before the computer is released via the flag signal. If synchronization is not provided, the computer could return with further paging commands before previously presented commands are received, stored and transmitted. Obviously, such a circumstance could result in the loss of paging commands.

The low going output of $\overline{Q}$, which occurs when W2 shifts to a binary one state and the one is clocked into FF1, as will be better understood from the following description, clears the shift control circuit, i.e., resets it to an initial state.

The shift control circuit 227 comprises: a NOR gate designated NOR6; a capacitor designated CP5; a resistor designated R30; a counter designated U1; and, a JK flip-flop designated FF2. The $\overline{Q}$ output of FF1 is connected through CP5 in series with R30 to VDD. The junction between R30 and CP5 is connected to the clear input of U1. The clock output of the visual paging clock 167 is connected to the one input of NOR6. The output of NOR6 is connected to the clock input of FF2. In addition, the output of NOR6 is connected to the second inputs of NOR3 and NOR4 of the shift/load control 229 so as to apply shift pulses thereto. The Q output of FF2 is connected to the J input of FF2 and the $\overline{Q}$ output of FF2 is connected to the K input of FF2. The $\overline{Q}$ output of FF2 is also connected to the count input of U1. The carry output of U1 is connected to the second input of NOR6.

Basically, the shift control provides timing for the entire visual paging data shifting process. The low going clear signal, ($\overline{Q}$ output of FF1) forms a pulse across CP5 that clears U1. Thus, U1 is reset to an initial condition when the W2 binary one is clocked into FF1. Resetting of U1 enables NOR6 to pass clock pulses since the carry output of U1 shifts to a binary zero state. The carry binary zero, as will be better understood from the following description, also causes the busy detector 231 to generate a busy signal and the reset driver 235 to reset the lampbank control 171 (FIG. 4). In any event, clock pulses passing through NOR6 and applied to the shift/load control 229 cause data to be shifted out of the WORD1 register and data from the WORD2 register to be shifted into the WORD1 register and then out. This data is applied to the data driver 223, and used as hereinafter described. The clock pulses passed by NOR6 are divided-by-two by FF2 and the resultant one-half count is counted by U1. When U1 reaches its maximum count, the carry output again shifts to a binary one state and disables NOR6. The next W2 binary one pulse causes the Q output of FF1 to achieve a binary zero state and the foregoing cycle repeats.

The busy detector 231 comprises: two inverters designated I64 and I65; a NOR gate designated NOR7; two resistors designated R31 and R32; and, an NPN transistor designated Q3. The carry output of U1 is connected through I64 to one input of NOR7. W2 is applied to the second input of NOR7. The output of NOR7 is connected through I65 is series with R31 to the base of Q3. The emitter of Q3 is connected through R32 to ground. The busy status signal is formed on the collector of Q3.

Basically, two signals initiate a busy signal. These signals are W2 and the clearing of U1. When W2 is in a binary one state, it causes NOR7 to drive the output of Q3 low. This low output represents a busy signal and remains as long as the following shift of the carry output of U1 remains in a binary zero state. Upon the termination of carry, i.e., its shifting from a zero state to a binary one state, the busy signal terminates. Thus, gating both W2 and the carry output of U1 to the busy detector insures that the computer will not attempt to transmit data during a visual display cycle, i.e., while data is being transferred from the WORD1 and WORD2 data registers to the lampbank display circuitry via the data driver 233.

The clock driver 232 comprises: an inverter designated I66; two resistors designated R33 and R34; and, an NPN transistor designated Q4. The output of NOR6 (which carries the clock pulses occurring during the data transfer sequence) are applied through I66 in series with R33 to the base of Q4. The collector of Q4 is connected to VDD. The emitter of Q4 is connected through R34 to ground. In essence, the clock driver meters out clock pulses to the lampbank control circuit equal in number to the number of pulses applied to the visual paging data shifting circuitry. This numerical control synchronizes the lampbank input data registers with the visual paging data being sent.

The data driver 233 comprises: two inverters designated I67 and I68; a JK flip-flop designated FF3; two resistors designated R35 and R36; and, an NPN transistor designated Q5. The data output of the WORD1 data register 251 is connected through I67 to the K input of FF3 and directly to the J input of FF3. The output of NOR6 is connected to the clock input of FF3. The Q output of FF3 is connected through I68 in series with R35 to the base of Q5. The collector of Q5 is connected to VDD. The emitter of Q5 is connected through R36 to ground. Lampbank data pulses are formed at the emitter of Q5. In operation, the data output of the WORD1 register is clocked through FF3 by the clock pulses occurring on the output of NOR6. This data is then transmitted to the data input of the lampbank control circuitry via I68, R35 and Q5.

The reset driver 235 comprises: an inverter designated I69; two resistors designated R37 and R38; and, an NPN transistor designated Q6. The carry output of U1 is applied through I69 in series with R37 to the base of Q6. The collector of Q6 is connected to VDD. The emitter of Q6 is connected through R38 to ground. The reset pulses are formed at the collector of Q6. Basically, a reset pulse is formed and sent to the lampbank display as long as the carry output of U1 is in a binary one state. This low reset signal holds the lampbank data registers in a reset or clear mode. The reset is removed during the data transmission periods, i.e., during the period of time that the carry output of U1 is in a binary zero state. As previously noted, such a period starts when the shift control binary counter U1 is cleared. The holding of the lampbank control system in a reset mode of operation during non-active periods insures that data or clock line noise does not introduce error signals into the system.

Figure 17:
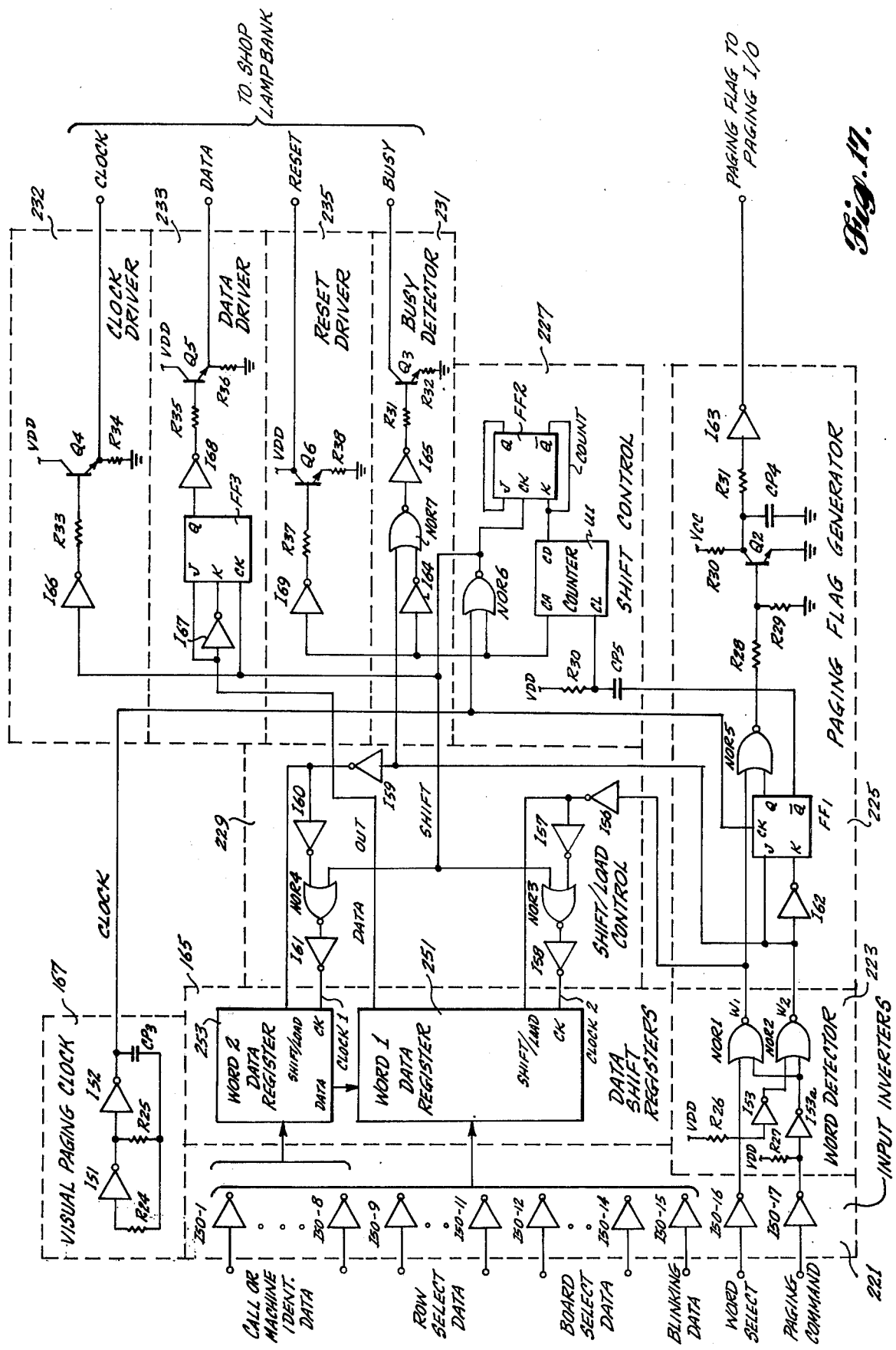
FIG. 17 is a logic diagram of a visual paging clock, data shift registers, a word detector, a shift/load control, a paging flag, a shift control, clock data and drivers, and reset and busy detectors suitable for use in the computer paging input control and the output line drivers illustrated in FIG. 7.
Figure 18:
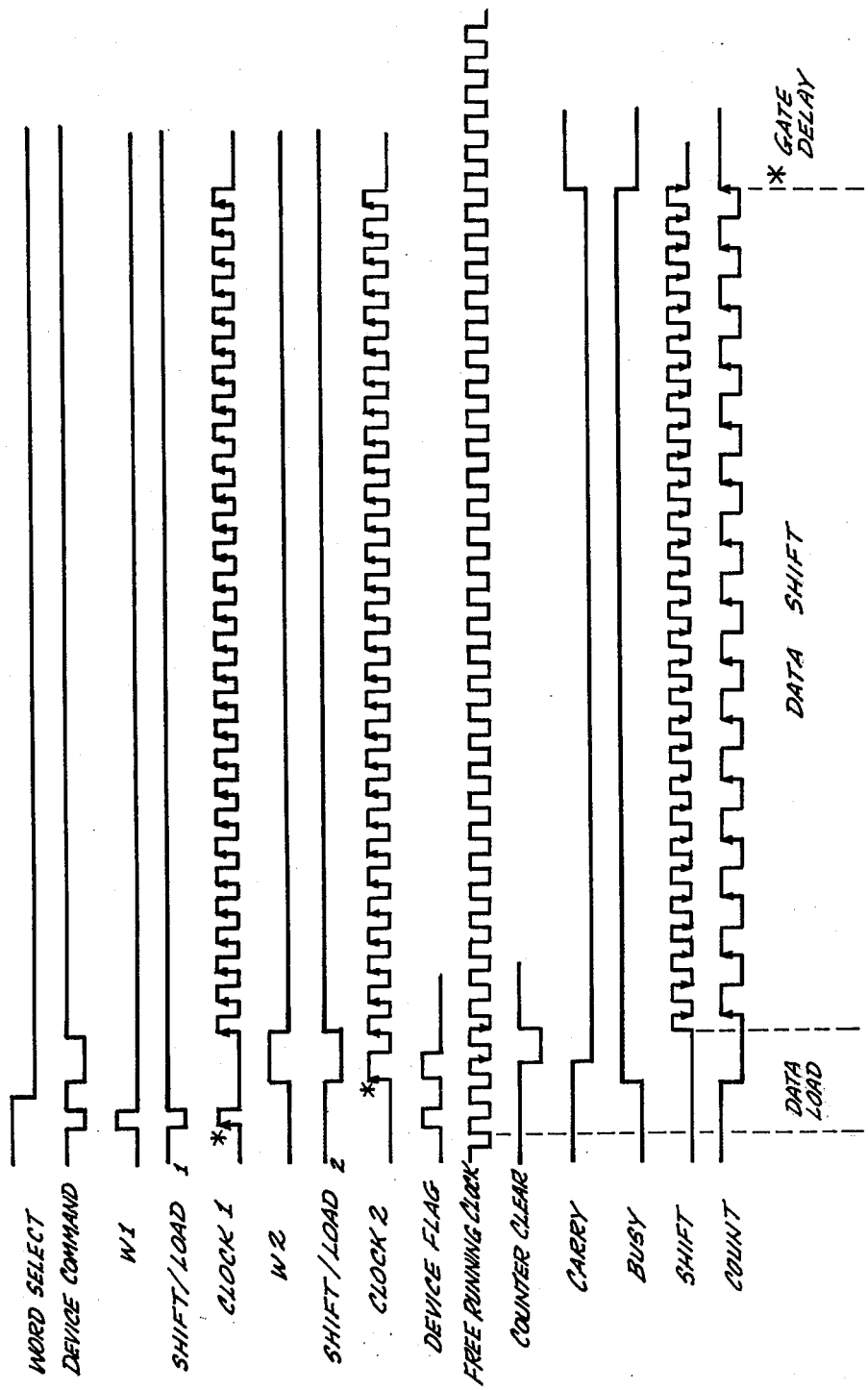
FIG. 18 is a timing diagram for the logic diagram illustrated in FIG. 17.

FIG. 18 is a timing diagram illustrating the operation of the system illustrated in FIG. 17 is accordance with the discussion set forth above. Basically, during a data load period, WORD1 and WORD2 data is loaded into the WORD1 and WORD2 data registers. Thereafter, the pulses generated by the visual paging clock (free-running clock pulses) clock data out of the WORD1 data register and from the WORD2 data register into the WORD1 data register and then out.

Figure 8:
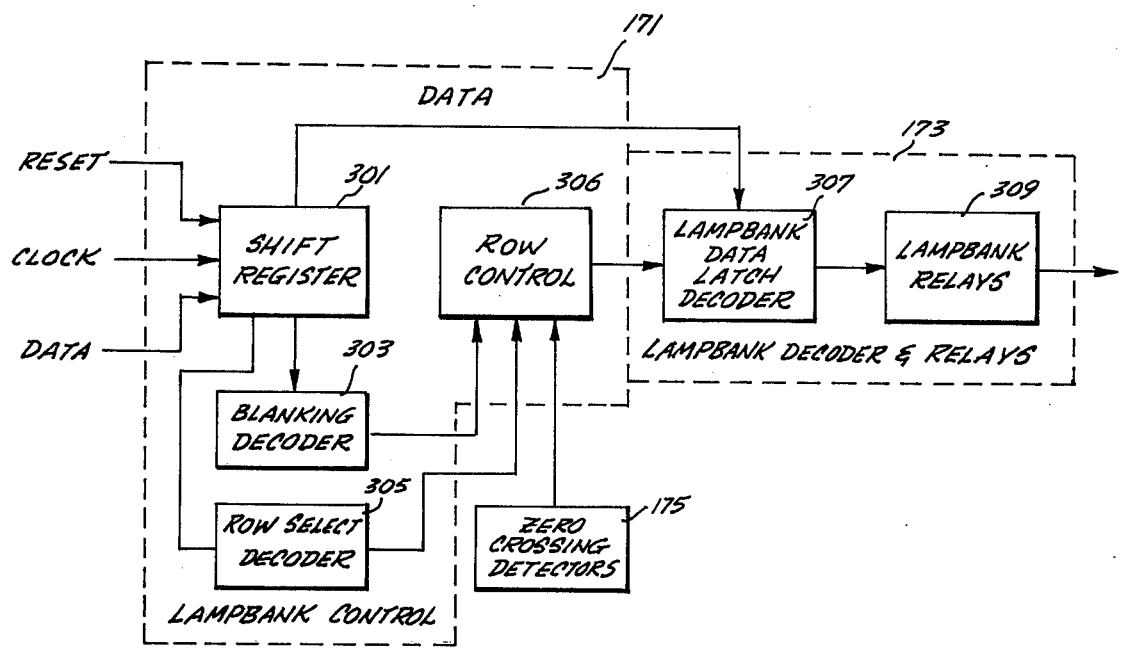
FIG. 8 is a subsystem block diagram of a lampbank control and a lampbank decoder and relays suitable for use in the system illustrated in FIG. 4.

FIG. 8 is a block diagram of a lampbank control 171 and lampbank decoder and relay circuit 173 suitable for use in the embodiment of the invention illustrated in FIG. 4. The lampbank control 171 comprises: a shift register 301; a blanking decoder 303; a row select decoder 305; and, a row control 306. The lampbank decoder and relay circuit 173 comprises: a lampbank decoder 307; and, lampbank relays 309. Also illustrated in FIG. 8 are the zero crossing detectors 175.

The shift register 301 receives the reset, clock and data outputs of the output line drivers 232, 233 and 235 illustrated in FIG. 17; and, applies signals to the blanking decoder 303, the row select decoder 305 and the lampbank data latch decoder 307. The banking decoder and the row select decoder are connected to the row control, as are the zero crossing detectors 175. The row control is connected to the lampbank data latch decoder; and, that decoder is connected to the lampbank relays 309.

In operation, serial visual paging commands are received by the shift register 301 as they are outputed by the data driver 233 illustrated in FIG. 17 and described above. As will be understood from the previous description, WORD1 is a 16 bit word and WORD2 is an eight bit word, thus, the total visual paging command data word shifted into the shift register 301 is a 24 bit word. The total data word is shifted until the marker bit reaches the most significant bit position. At this point, row selection codes are decoded by the row select decoder 305. The row select decoder via the row control 306 enables the appropriate set of solid state latches forming a portion of the lampbank data latch decoder 307. The zero crossing detectors are provided so that such enablement occurs just prior to the point in time the A/C power used to energize the display lamps of the lampbank display goes through zero. This enablement allows the latches to read the data related to machine number and call number stored in the shift register 301.

The row control 306 merely controls the rows selected by the row select decoder 305. A row containing information can not be changed until it is blanked. Only rows which are in a blanking condition can receive and display information. The computer controls the placement of all paging board information.

The blanking decoder 303, as previously discussed, senses the presence of a blanking command and causes blanking of the associated lampbank row. As briefly noted above, the zero crossing detectors 175 are provided such that the enablement of the lampbank data latch decoder 307 (and, thus, the lampbank relays 309 that they control) occurs just prior to the zero crossing point of the 60-cycle A/C power. The time period between the transmission of data and the zero crossing is chosen such that the contacts of the relays close at the zero crossing point. Thus, arcing across the contacts is substantially reduced. A zero crossing detector circuit suitable for use by the invention is described in U.S. Patent application Ser. No. 666,642, filed Mar. 15, 1976, entitled "Zero Crossing AC Relay Control Circuit" executed and filed by Jansey D. Tieden simultaneously with the execution and filing of this application.

It will be appreciated from the foregoing description that the invention basically comprises a system for sequentially interrogating a plurality of N/C machines. The machines are interrogated to determine: their status of operation; whether or not the operator of the machine needs assistance; and, whether or not the machine is operating in an N/C or an override mode of operation. This information is primarily utilized by a computer to control a visual paging display located in the shop region. The visual paging display allows support personnel in the machine shop area to rapidly respond to calls for assistance. Thus, the chip cutting time (productivity) of the machines is greatly increased. In addition, the computer controls a management display board located in a control room. The status board displays information denoting the status of the machines, and whether or not a particular machine is requesting a call for assistance, and the type of call. In addition, the maintenance request information is transmitted to a maintenance room, for obtaining a response to requests for maintenance and for scheduling maintenance personnel. The information being displayed on the status board, may also be printed out on a suitable control room printer, such as a teletype. Finally, information related to machine down time, chip cutting time, calls for various types of assistance, time of operation in an N/C and/or override mode of operation, etc. can be accumulated per machine, per shop area, or in any other desired manner. The accumulated information is available for use in producing reports at any desired time interval, i.e., daily, shift, weekly, monthly, etc.

While it is believed that any programmer of average skill in the digital computer programming art can readily program any general purpose digital computer WORD1 register (and from the WORD 2 register into the WORD1 data register and then out), by the shift pulses applied to the clock inputs of the WORD1 and WORD2 data registers via the respective NOR gates (NOR3 and NOR4) and their output inverters (I58 and I61). At this time both W1 and W2 are in binary zero states whereby the one state of the outputs of I56 and I59 place the WORD1, and WORD2 data registers in a shift, as opposed to a load, mode of operation.

The paging flag generator 225 comprises: two inverters designated I62 and I63; a JK flip-flop designated FF1; a two-input NOR gate designated NOR5; four resistors designated R28 − R31; a NPN transistor designated Q2; and, a capacitor designated CP4. W1 is applied to one input of NOR5. W2 is applied directly to the J input of FF1 and through I62 to the K input of FF1. The clock output of the visual paging clock 167 is applied to the clock input of FF1. The Q output of FF1 is connected to the second input of NOR5. The output of NOR5 is connected through R28 to the base of Q2 and through R29 to ground. The emitter of Q2 is connected ground. The collector of Q2 is connected through R30 to VCC, through R31 to the input of I63 and through CP4 to ground. The paging flag is formed on the output of I63.

In operation, paging flag is generated for each of the two computer words. The shift of W1 to a binary one state causes the output of NOR5 to turn Q5 off and produce a flag—the Q output of FF1 being in a binary zero state when the shift of W1 to a binary one state occurs. This signal transition is delayed by R29 and CP4 to insure that the WORD1 data is latched into the WORD1 data register 251 before the flag signal is generated. I63 provides drive to signal the paging I/O that data transfer has been completed. The shift of W2 to a binary one state causes FF1 to change states (i.e., shifts to a binary one state and $\overline{Q}$ shifts to a binary zero state) on the next low going paging clock pulse. Thereafter, a W2 paging flag is generated in the same manner as a W1 paging flag. The time delay arrangement insures that visual paging is brought into synchronization with the computer (i.e., commands are received and stored) before the computer is released via the flag signal. If synchronization is not provided, the computer could return with further paging commands before previously presented commands are received, stored and transmitted. Obviously, such a circumstance could result in the loss of paging commands.

The low going output of $\overline{Q}$, which occurs when W2 shifts to a binary one state and the one is clocked into FF1, as will be better understood from the following description, clears the shift control circuit, i.e., resets it to an initial state.

The shift control circuit 227 comprises: a NOR gate designated NOR6; a capacitor designated CP5; a resistor designated R30; a counter designated U1; and, a JK flip-flop designated FF2. The $\overline{Q}$ output of FF1 is connected through CP5 in series with R30 to VDD. The junction between R30 and CP5 is connected to the clear input of U1. The clock output of the visual paging clock 167 is connected to the one input of NOR6. The output of NOR6 is connected to the clock input of FF2. In addition, the output of NOR6 is connected to the second inputs of NOR3 and NOR4 of the shift/load control 229 so as to apply shift pulses thereto. The Q output of FF2 is connected to the J input of FF2 and the $\overline{Q}$ output of FF2 is connected to the K input of FF2. The $\overline{Q}$ output of FF2 is also connected to the count input of U1. The carry output of U1 is connected to the second input of NOR6.

Basically, the shift control provides timing for the entire visual paging data shifting process. The low going clear signal, ($\overline{Q}$ output of FF1) forms a pulse across CP5 that clears U1. Thus, U1 is reset to an initial condition when the W2 binary one is clocked into FF1. Resetting of U1 enables NOR6 to pass clock pulses since the carry output of U1 shifts to a binary zero state. The carry binary zero, as will be better understood from the following description, also causes the busy detector 231 to generate a busy signal and the reset driver 235 to reset the lampbank control 171 (FIG. 4). In any event, clock pulses passing through NOR6 and applied to the shift/load control 229 cause data to be shifted out of the WORD1 register and data from the WORD2 register to be shifted into the WORD1 register and then out. This data is applied to the data driver 223, and used as hereinafter described. The clock pulses passed by NOR6 are divided-by-two by FF2 and the resultant one-half count is counted by U1. When U1 reaches its maximum count, the carry output again shifts to a binary one state and disables NOR6. The next W2 binary one pulse causes the Q output of FF1 to achieve a binary zero state and the foregoing cycle repeats.

The busy detector 231 comprises: two inverters designated I64 and I65; a NOR gate designated NOR7; two resistors designated R31 and R32; and, an NPN transistor designated Q3. The carry output of U1 is connected through I64 to one input of NOR7. W2 is applied to the second input of NOR7. The output of NOR7 is connected through I65 is series with R31 to the base of Q3. The emitter of Q3 is connected through R32 to ground. The busy status signal is formed on the collector of Q3.

Basically, two signals initiate a busy signal. These signals are W2 and the clearing of U1. When W2 is in a binary one state, it causes NOR7 to drive the output of Q3 low. This low output represents a busy signal and remains as long as the following shift of the carry output of U1 remains in a binary zero state. Upon the termination of carry, i.e., its shifting from a zero state to a binary one state, the busy signal terminates. Thus, gating both W2 and the carry output of U1 to the busy detector insures that the computer will not attempt to transmit data during a visual display cycle, i.e., while data is being transferred from the WORD1 and WORD2 data registers to the lampbank display circuitry via the data driver 233.

The clock driver 232 comprises: an inverter designated I66; two resistors designated R33 and R34; and, an NPN transistor designated Q4. The output of NOR6 (which carries the clock pulses occurring during the data transfer sequence) are applied through I66 in series with R33 to the base of Q4. The collector of Q4 is connected to VDD. The emitter of Q4 is connected through R34 to ground. In essence, the clock driver meters out clock pulses to the lampbank control circuit equal in number to the number of pulses applied to the visual paging data shifting circuitry. This numerical control synchronizes the lampbank input data registers with the visual paging data being sent.

The data driver 233 comprises: two inverters designated I67 and I68; a JK flip-flop designated FF3; two resistors designated R35 and R36; and, an NPN transistor designated Q5. The data output of the WORD1 data register 251 is connected through I67 to the K input of FF3 and directly to the J input of FF3. The output of NOR6 is connected to the clock input of FF3. The Q output of FF3 is connected through I68 in series with R35 to the base of Q5. The collector of Q5 is connected to VDD. The emitter of Q5 is connected through R36 to ground. Lampbank data pulses are formed at the emitter of Q5. In operation, the data output of the WORD1 register is clocked through FF3 by the clock pulses occurring on the output of NOR6. This data is then transmitted to the data input of the lampbank control circuitry via I68, R35 and Q5.

The reset driver 235 comprises: an inverter designated I69; two resistors designated R37 and R38; and, an NPN transistor designated Q6. The carry output of U1 is applied through I69 in series with R37 to the base of Q6. The collector of Q6 is connected to VDD. The emitter of Q6 is connected through R38 to ground. The reset pulses are formed at the collector of Q6. Basically, a reset pulse is formed and sent to the lampbank display as long as the carry output of U1 is in a binary one state. This low reset signal holds the lampbank data registers in a reset or clear mode. The reset is removed during the data transmission periods, i.e., during the period of time that the carry output of U1 is in a binary zero state. As previously noted, such a period starts when the shift control binary counter U1 is cleared. The holding of the lampbank control system in a reset mode of operation during non-active periods insures that data or clock line noise does not introduce error signals into the system.

FIG. 18 is a timing diagram illustrating the operation of the system illustrated in FIG. 17 is accordance with the discussion set forth above. Basically, during a data load period, WORD1 and WORD2 data is loaded into the WORD1 and WORD2 data registers. Thereafter, the pulses generated by the visual paging clock (free-running clock pulses) clock data out of the WORD1 data register and from the WORD2 data register into the WORD1 data register and then out.

FIG. 8 is a block diagram of a lampbank control 171 and lampbank decoder and relay circuit 173 suitable for use in the embodiment of the invention illustrated in FIG. 4. The lampbank control 171 comprises: a shift register 301; a blanking decoder 303; a row select decoder 305; and, a row control 306. The lampbank decoder and relay circuit 173 comprises: a lampbank decoder 307; and, lampbank relays 309. Also illustrated in FIG. 8 are the zero crossing detectors 175.

The shift register 301 receives the reset, clock and data outputs of the output line drivers 232, 233 and 235 illustrated in FIG. 17; and, applies signals to the blanking decoder 303, the row select decoder 305 and the lampbank data latch decoder 307. The banking decoder and the row select decoder are connected to the row control, as are the zero crossing detectors 175. The row control is connected to the lampbank data latch decoder; and, that decoder is connected to the lampbank relays 309.

In operation, serial visual paging commands are received by the shift register 301 as they are outputed by the data driver 233 illustrated in FIG. 17 and described above. As will be understood from the previous description, WORD1 is a 16 bit word and WORD2 is an eight bit word, thus, the total visual paging command data word shifted into the shift register 301 is a 24 bit word. The total data word is shifted until the marker bit reaches the most significant bit position. At this point, row selection codes are decoded by the row select decoder 305. The row select decoder via the row control 306 enables the appropriate set of solid state latches forming a portion of the lampbank data latch decoder 307. The zero crossing detectors are provided so that such enablement occurs just prior to the point in time the A/C power used to energize the display lamps of the lampbank display goes through zero. This enablement allows the latches to read the data related to machine number and call number stored in the shift register 301.

The row control 306 merely controls the rows selected by the row select decoder 305. A row containing information can not be changed until it is blanked. Only rows which are in a blanking condition can receive and display information. The computer controls the placement of all paging board information.

The blanking decoder 303, as previously discussed, senses the presence of a blanking command and causes blanking of the associated lampbank row. As briefly noted above, the zero crossing detectors 175 are provided such that the enablement of the lampbank data latch decoder 307 (and, thus, the lampbank relays 309 that they control) occurs just prior to the zero crossing point of the 60-cycle A/C power. The time period between the transmission of data and the zero crossing is chosen such that the contacts of the relays close at the zero crossing point. Thus, arcing across the contacts is substantially reduced. A zero crossing detector circuit suitable for use by the invention is described in U.S. Patent application Ser. No. 666,642, filed Mar. 15, 1976, entitled "Zero Crossing AC Relay Control Circuit" executed and filed by Jansey D. Tieden simultaneously with the execution and filing of this application.

It will be appreciated from the foregoing description that the invention basically comprises a system for sequentially interrogating a plurality of N/C machines. The machines are interrogated to determine: their status of operation; whether or not the operator of the machine needs assistance; and, whether or not the machine is operating in an N/C or an override mode of operation. This information is primarily utilized by a computer to control a visual paging display located in the shop region. The visual paging display allows support personnel in the machine shop area to rapidly respond to calls for assistance. Thus, the chip cutting time (productivity) of the machines is greatly increased. In addition, the computer controls a management display board located in a control room. The status board displays information denoting the status of the machines, and whether or not a particular machine is requesting a call for assistance, and the type of call. In addition, the maintenance request information is transmitted to a maintenance room, for obtaining a response to requests for maintenance and for scheduling maintenance personnel. The information being displayed on the status board, may also be printed out on a suitable control room printer, such as a teletype. Finally, information related to machine down time, chip cutting time, calls for various types of assistance, time of operation in an N/C and/or override mode of operation, etc. can be accumulated per machine, per shop area, or in any other desired manner. The accumulated information is available for use in producing reports at any desired time interval, i.e., daily, shift, weekly, monthly, etc.

Figure 19:
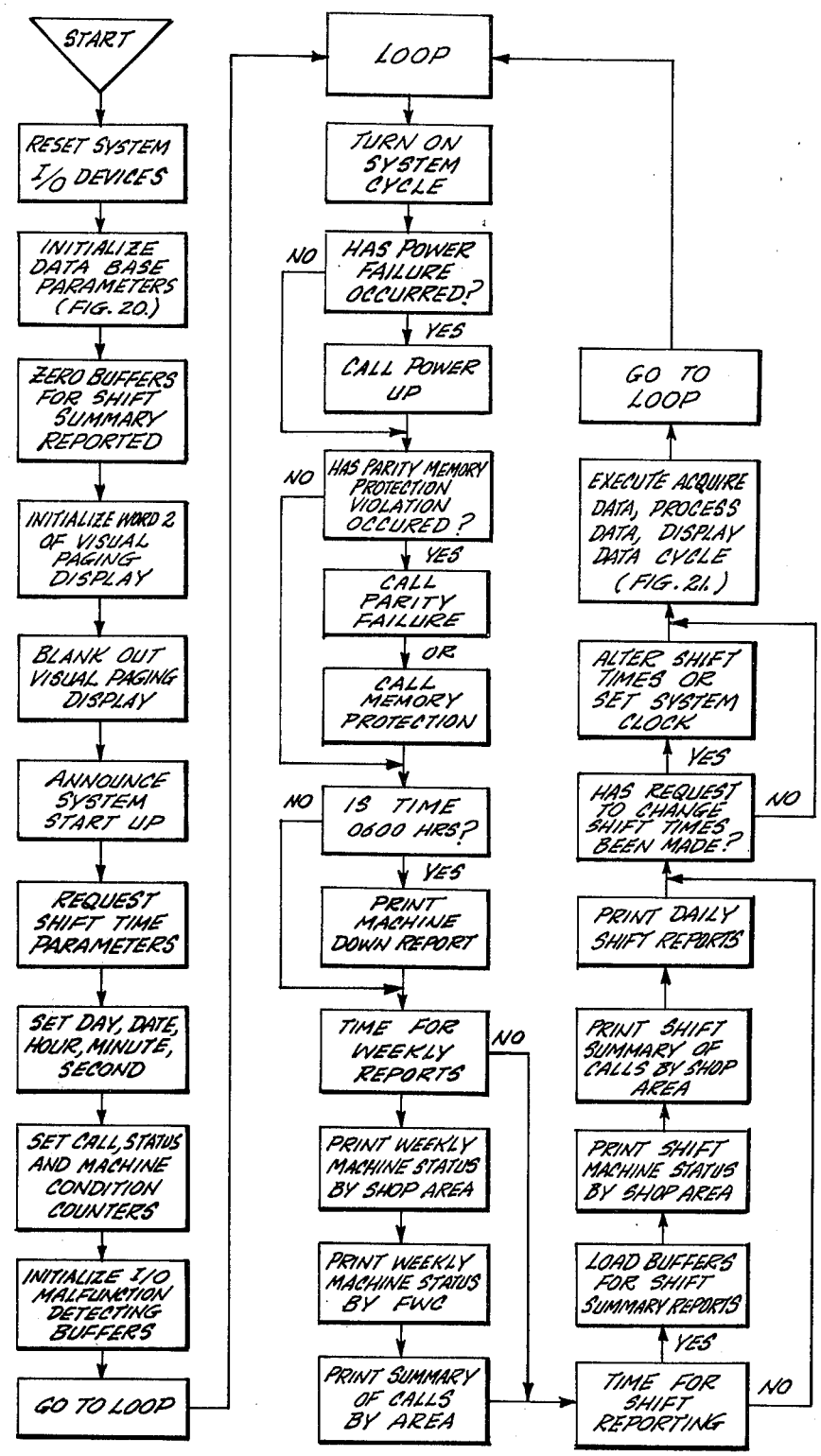
FIG. 19 is a system flow diagram illustrating the CPU executive program.

While it is believed that any programmer of average skill in the digital computer programming art can readily program any general purpose digital computer (for example, an HP2100S computer, produced by the Hewlett Packard Company of Cupertino, Calif.) to perform the functions of the computer illustrated in FIG. 1, in order to provide assistance in such programming, a flow diagram of a suitable program is illustrated in FIGS. 19–25. FIG. 19 illustrates the base program and FIGS. 20–24 illustrate sub-programs useful in the base program.

As illustrated on the left side of FIG. 19, subsequent to start-up, the system is initialized by: resetting system I/O devices; initializing the data base parameters (see FIG. 20); zeroing the buffers for any shift summary reports made previously or erroneous data present at system startup; initializing WORD2 (set blanking bit) of the visual paging display; blanking of all visual paging displays; announcing system start-up on the system on-line teletype; requesting shift time parameters and obtaining day, date, hour, minute and second data (via on-line teletype); setting call, status and machine condition counters; and, initializing I/O malfunction detecting buffers. After this system initialization sequence, loop operation starts.

Figure 20:
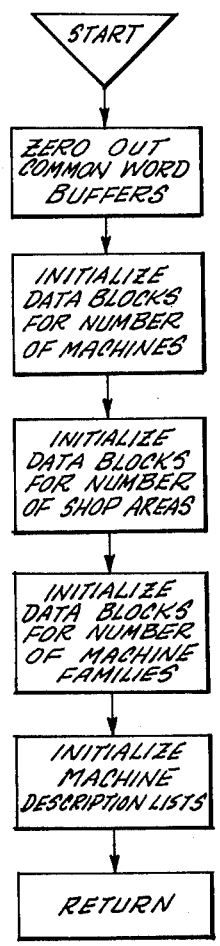
FIG. 20 is a subsystem flow diagram, illustrating the initializing of the data base parameters.

As illustrated in FIG. 20, initializing of the data base parameters step of FIG. 19 includes: zeroing out common word buffers (scratch pad area for program data manipulation) initializing data blocks for the number of machines to be interrogated; initializing data blocks for the number of shop areas involved; initializing data blocks for the data collection by factory identification codes (codes related to the types or families of machines in the shop); and, initializing machine description lists to be used during report generation.

The main program loop is illustrated in the center and right side of FIG. 19. Subsequent to system cycle turn on, certain tests are made including: a system power failure test; a test to determine if memory bounds or parity protection have been violated; a test to determine if it is time to print a machine down report; a test to determine if it is time to produce weekly reports; a test to determine if it is time to produce shift reports; and, a test to determine if a request to change shift times has occurred. Depending upon the nature of the tests checks of related subsystems are made, reports are produced or shift times may be changed. After the tests are complete, the loop shifts to a data acquisition, processing and display cycle, generally illustrated in FIG. 21.

Figure 22:
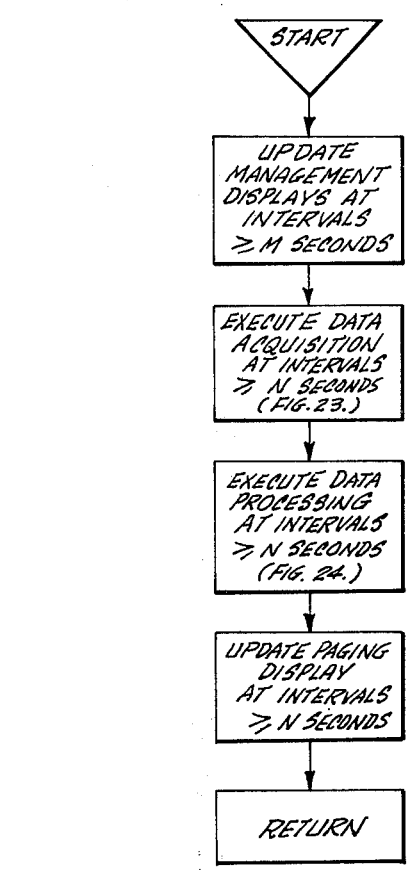
FIG. 22 is a subsystem flow diagram detailing a portion of the flow diagram illustrated in FIG. 21.

In the acquisition, processing and display cycle, the number of machines and constants for machine data blocks are first set. Thereafter, system input data is updated as are display and paging units. The updating cycle is illustrated in FIG. 22 and comprises first updating management displays at predetermined intervals of less than or equal to M seconds. Next, data acquisition (FIG. 23); data processing (FIG. 24; and paging display updating steps at intervals of greater than or equal to N seconds are performed.

The data acquisition step, illustrated in FIG. 23, comprises sequentially interrogating all of the machines. First, the loop index for the number of machines is set. Then, for each machine: the machine interrogation address is set and outputed; a delay for data line settling is turned on; the status of the data I/O is checked; the machine data words are picked up; the status of the data I/O is zeroed out (NOT BUSY); the previous machine data word is set to equal the current machine data word; the current machine data word is updated; current call, status and machine condition information is extracted from the current machine data word; the current call is compared with the previous call; the current status is compared to the previous status; the current machine condition is compared with the previous machine condition; and, then, the next machine is interrogated (i.e., the foregoing steps are repeated). If any of the comparison tests determine that a lack of comparison exists a time mark denoting the receipt of a new code is recorded.

Figure 24A:
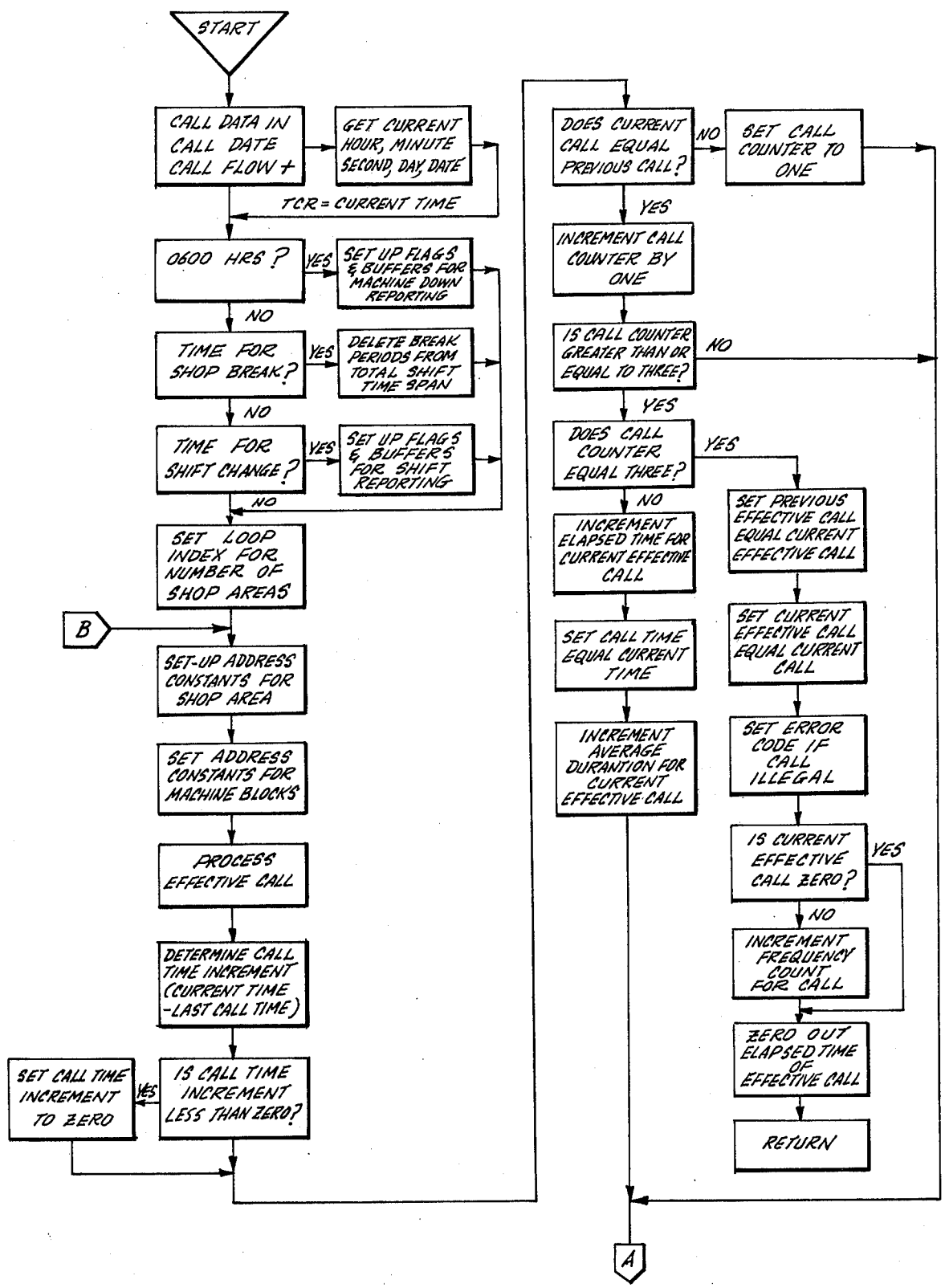
FIG. 24 (a) and (b) is a subsystem flow diagram detailing the processing of acquired data; and, FIG. 25 is a block diagram illustrating the coupling together of FIGS. 24 (a) and (b).
Figure 24B:
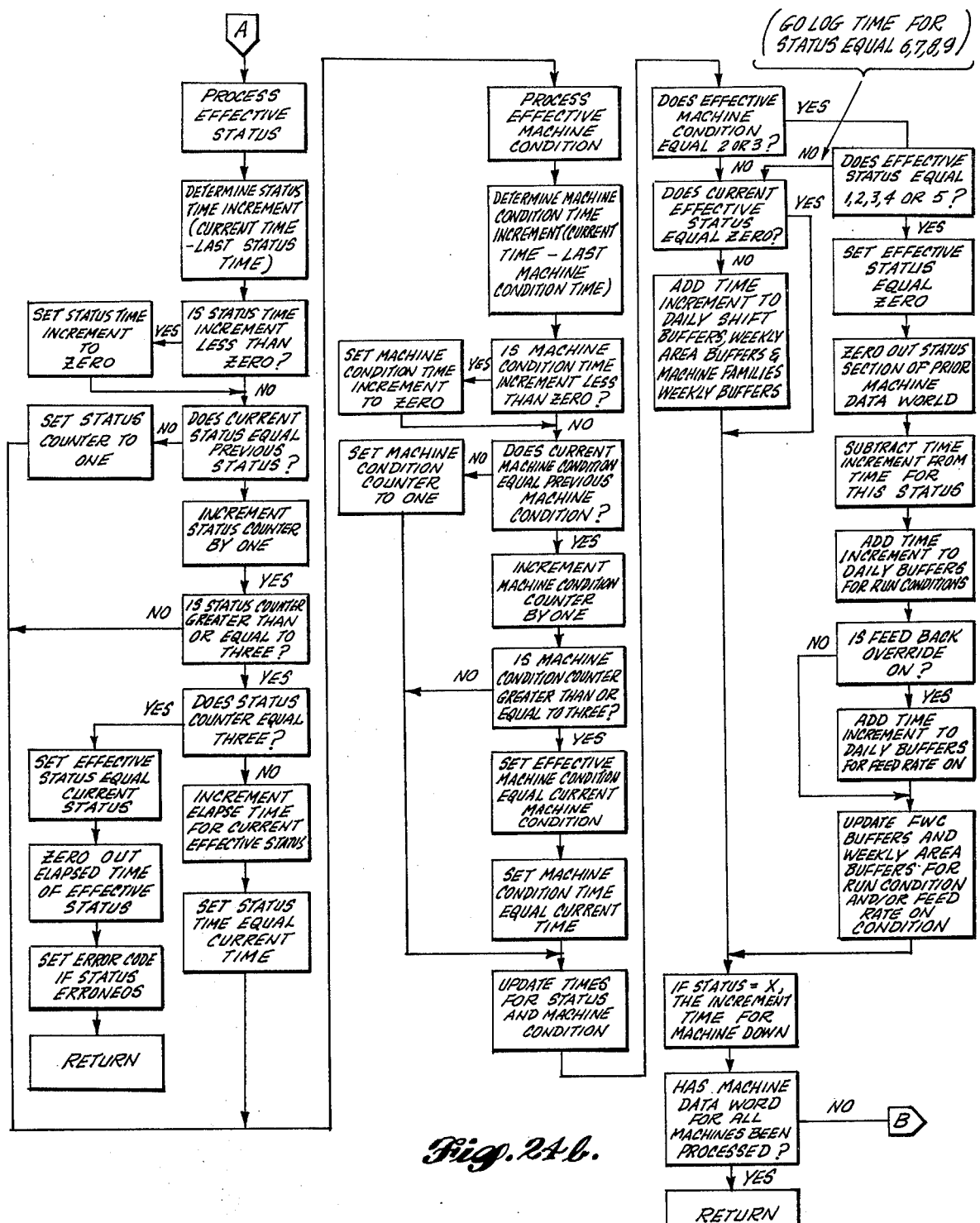
Figure 25:
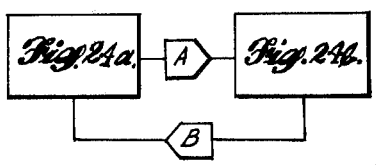

Initially, during the data processing step, illustrated in FIGS. 24(a) and 24(b), acquired data is called for, and the date and time is set. Tests are then run to determine if it is time for any of: machine down time reporting; a shop break; and a shift change. If reports are due the appropriate buffers are flagged and set-up for reporting. If it is time for a shop break, the break period time is ignored from the shift data collection. After these tests have been performed and the appropriate action taken, if any, the loop index is set for the number of shop areas.

The data processing loop starts with the setting up of address constants for the shop area and for the machine data blocks. Then, effective calls are processed. First, a determination of the call time increment is made, i.e., the time since the last increment (current time minus last call time). If the call time is less than zero, the call time increment is set to zero. Then a test is made to determine whether or not the current call equals the previous call. If it does not, the call counter for the machine is set to one and the loop skips to the status processing sequence [FIG. 24(b)]. If it does equal the previous call, the call counter is incremented by one and a test is made to determine whether or not the call counter is greater than, or equal to three. If the call counter count is less than three, the loop skips to the status processing sequence. If the call counter count is greater than or equal to three, a test is made to determine whether or not it is equal to three. If the call counter count does not equal three; the elapsed time count for the current effective call is incremented; the call time is set equal to the current time; the average duration time for an effective call is incremented; and the status processing sequence is started. If the call counter count is equal to three, the previous effective call is made equal to the current effective call and the current effective call is set equal to the current call. (Effective calls are those causing displays whereas current calls are those that have been detected but have not existed for three interrogation cycles). If the effective call is illegal, an error code is set. If the effective call is zero, the elapsed time of the effective call is zeroed out. If it is not zero, the frequency count for the call is incremented, before the elapsed time of the effective call is zeroed out. The sequence then returns to the subloop illustrated in FIG. 22 to cause an error print or an effective call paging display.

In the status processing sequence (FIG. 24*b*), effective status data is processed; then, the status time interval is determined (current time versus last status time). If the status time is less than zero the status time increment is set to zero. Next, a test is made to determine if the current status equals the previous status. If unequal, the status counter is set to one and the loop skips to the machine condition processing sequence. If equal, the status counter is incremented by one. Next, a test is made to determine whether or not the count of the status counter is greater than or equal to three. If this count is not equal to three, the loop skips to the effective machine condition processing sequence. If this count is greater than or equal to three, a test is made to determine whether or not the status counter equals three. If the status counter count is greater than three, the elapsed time count for the current effective status is incremented and the status time is set equal to the current time. Then, the loop skips to the effective machine condition processing sequence. If the status counter count equals three, the effective status is set equal to the current status and the elapsed time of the effective status is zeroed out. Then, if an erroneous status indication has been detected an error code is generated. Next, the sequence returns to the subloop illustrated in FIG. 22 to cause an error print or a status display change.

Initially, during the effective machine condition processing, the machine condition time increment is determined (current time minus last machine condition time). If the machine condition time increment is less than zero, the machine condition time increment is set to zero. Next a test is made to determine whether or not the current machine condition equals the previous machine condition. If not equal, the machine condition counter is set to one and the loop skips to a status and machine condition updating sequence. If the current machine condition equals the previous machine condition, the machine condition counter is incremented by one and a test is made to determine whether or not the machine condition counter is greater than or equal to three. If not equal, the loop shifts to the status and machine condition updating sequence. If equal to three, the effective machine condition is set equal to the current machine condition and machine condition time is set equal to current time. The status and machine condition updating sequence starts with an updating step. Then, a test is made to determine whether or not the effective machine condition is equal to two or three. In this regard, in one actual embodiment of the invention, there are three possible machine conditions. These conditions are: override mode alone (condition 1); N/C mode alone (condition 2); and, N/C mode plus override mode (condition 3). In this same embodiment there are nine possible status states. These states are: set up (state 1); part handling (state 2); operator away (state 3); machine deactivated (state 4); special study code (state 5); tape try-out (state 6); maintenance (state 7); machine unassigned (state 8); and, manual run time (state 9).

Returning to FIG. 24(b), if the effective machine condition is equal to condition 2 or condition 3, then a test is made to determine whether or not the effective status is equal to one of status states 1, 2, 3, 4 or 5. If the effective status is equal to any of these states, the effective status is set equal to zero (since these states are not related to chip cutting) and the status section of prior machine data words is zeroed out. Next, the time increment count for this status is deleted and the time increment is added to the daily buffers related to run conditions. Next, a test is made to determine whether or not the feed rate overdrive is on. If it is one, the time increment is added to the buffers accumulating feed rate on time. Thereafter, the machine family buffers and weekly area buffers for run condition and/or feed rate time are updated; and, the loop shifts to a maintenance code check.

If the effective machine condition did not equal two or three, then the current effective status is checked to determine whether or not it equals zero. (This same test is performed if the status state was not 1, 2, 3, 4 or 5 of foregiong sequence). If the current effective status does not equal zero, the time increment is added to the daily shift buffers, weekly area buffers and machine family weekly buffers. If equal to zero, this time increment adding step is skipped.

Next, a determination is made as to whether or not the status code is a maintenance code (state 7). If a maintenance code exists, the buffer relating to machine down time is incremented. Next, a determination is made as to whether or not the machine data word for all machines has been processed. If not, the processing cycle repeats.

After the machine data words for all machines have been processed, the FIG. 22 paging display updating step (at intervals greater than or equal to N seconds) takes place. Thereafter, the subcycle illustrated in FIG. 21 continues.

Figure 21:
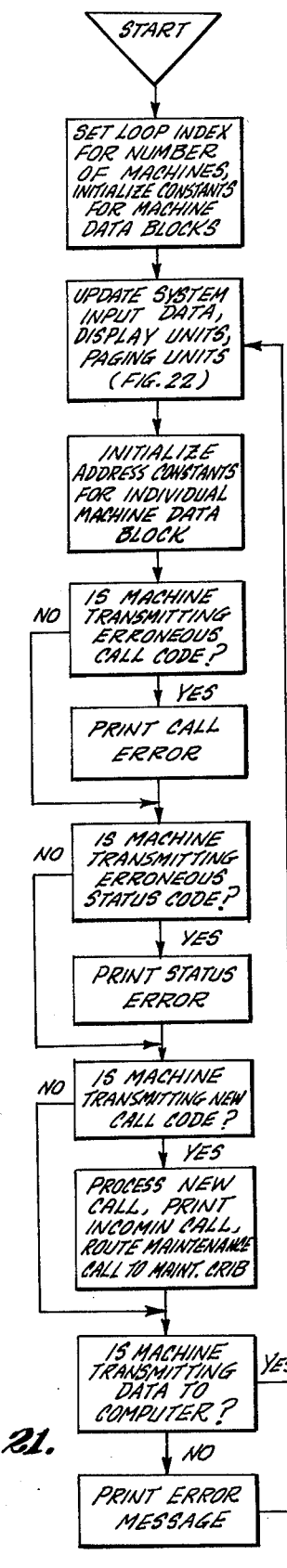
FIG. 21 is a sybsystem flow diagram, illustrating the acquisition of data from operator modules, the processing of data and the displaying of data.

The next step in the FIG. 21 subcycle is the initializing of the address constants for individual machine data blocks. The tests are made to determine: whether or not the machine is transmitting an erroneous call code; whether or not any machine is transmitting an erroneous status code; whether or not any machine is transmitting a new call code; whether or not each machines is transmitting data to the computer; and, whether or not the management display for each individual machine display is receiving data. As these tests are performed printing of appropriate message and/or updating of the visual paging display actions occur. Thereafter, the loop index is incremented and a decision is made as to whether or not all machines have been checked. If not, the subloop repeats. If all machines have been checked, the subloop terminates and the sequence returns to the main loop illustrated in FIG. 19, which recycles.

It will be appreciated from the foregoing brief discussion of a program suitable for programming a computer to perform in accordance with the teachings of this invention, that such a program merely controls a computer such that the computer: first, initializes the system as necessary; then, performs certain internal tests to determine certain conditions; next, acquires and processes machine data; and, finally, controls visual paging and management display boards. In addition, buffers are updated, by the program, such that reports are produced at predetermined intervals, also under the control of the program.

It will be appreciated from the foregoing description that the invention provides a system primarily adapted to rapidly obtain assistance for an operator on an "as needed" basis. This rapid response time decreases machine down time whereby a corresponding increase in chip cutting time occurs. The increase in chip cutting time, which is a direct measure of productivity, results in substantial benefits. Not only is the invention adapted to improve support personnel response time, it also provides information at a central location, the information being adequate to indicate to shop and control room personnel the status of operation of all N/C machines under their supervision. In addition, the invention provides, at regular intervals, reports suitable for use by management for both short and long term analysis of the production capability and operation of an N/C machine area.

While a preferred embodiment of the invention has been illustrated and described, it will be appreciated by those skilled in the art and others that various changes can be made therein without departing from the spirit and scope of the invention. For example, paging commands may be transmitted in a voltage push-pull manner from the CPU to the paging display control subsystem (or between portions thereof) located in the shop area, if desired. Hence, the invention can be practiced otherwise than as specifically described herein.

The embodiments of the invention in which an exclusive property or privilege is claimed are defined as follows:

1. Apparatus for use in increasing the productivity of a plurality of N/C machines located in a common shop area, said apparatus comprising:
   A. a plurality of operator modules, one associated with each of said N/C machines, each of said operator modules:
      1. being individually addressable by a predetermined digital interrogation code; and,
      2. including manually adjustable encoding means for producing:
         a. a digital call code related to the support assistance needs of the operator of the machine; and,
         b. a digital status code related to the status of the machine;
   B. a CPU, connected to said plurality of operator modules, for:
      1. producing predetermined digital interrogation codes suitable for addressing said plurality of operator modules;
      2. interrogating said plurality of operator modules by sequentially applying said digital interrogation codes to said plurality of operator modules;
      3. receiving the digital call and status codes produced by each of said N/C machines;
      4. producing digital paging codes related to said digital call codes, said digital paging codes being suitable for controlling at least one visual paging board such that said visual paging board displays alphanumeric characters related to said digital call codes; and,
      5. producing digital status board codes related to said digital status codes, said digital status board codes suitable for controlling a status board display adapted to display alphanumeric characters related to said digital status codes;
   C. at least one visual paging board connected to said CPU and suitable for location in said common shop area for receiving said digital paging codes and creating alphanumeric character displays in accordance therewith; and,
   D. a status board connected to said CPU for receiving said digital status board codes and creating a plurality of alphanumeric character displays in accordance therewith, one display of each of said plurality of alphanumeric character displays being related to a particular N/C machine of said plurality of N/C machines. appropriate messages 2. Apparatus as claimed in claim 1 including a common electrical bus formed of a plurality of individual wires connecting said plurality of operator modules to said CPU in a partyline manner.

3. Apparatus as claimed in claim 2 wherein said digital interrogation codes are transmitted from said CPU to said plurality of operator modules in a voltage push-pull manner and wherein said digital call and status codes are transmitted from said plurality of operator modules to said CPU in a voltage push-pull manner.

4. Apparatus as claimed in claim 3 wherein:
   each of said operator modules includes an interrogate address decoder suitable for producing an ENABLE signal when the digital interrogation code being received is the individual address code for the related operator module; and,
   said manually adjustable encoding means includes a plurality of manually position adjustable digital switches and a plurality of CMOS bilateral switches connected to said plurality of manual adjustable digital switches and to said interrogate address decoder such that said plurality of CMOS bilateral switches transfer information, related to the state of said manually adjustable digital switches, from their inputs to their outputs when said interrogate address decoder generates said ENABLE signal.

5. Apparatus as claimed in claim 4 wherein each of said plurality of manually adjustable switches includes a plurality of sets of single pole, double throw contacts, the position of said contacts having a digital code relationship to the manual adjustment of the switch to which they relate, and wherein a pair of CMOS bilateral switches of said plurality of CMOS bilateral switches are associated with each set of single pole, double throw switch contacts, the input of one of said pair of CMOS bilateral switches being connected to one of the remote terminals of the related single pole, double throw switch contacts and the input of the other of said pair of CMOS bilateral switches being connected to the other remote terminal of the related single pole, double throw switch contacts, whereby the outputs of said pair of said CMOS bilateral switches are in complementary form, said complementary form being related to the state of the related single pole, double throw switch contacts.

6. Apparatus as claimed in claim 5 including:
   a plurality of mode status sensors, one associated with each of said N/C machines, said mode status sensors adapted to sense whether its associated N/C machine is in an N/C mode of operation, or in an override mode of operation; and,
   a plurality of mode encoding means, one associated with each of said mode status sensors for producing a digital machine condition code related to the information sensed by said sensing means.

7. Apparatus as claimed in claim 6 wherein each said mode encoding means comprises a pair of CMOS bilateral switches connected to said sensing means for producing push-pull voltage signals related to the information sensed by said sensing means, the control inputs of said pair of CMOS bilateral switches being connected to the ENABLE output of said interrogate address decoder.

8. Apparatus as claimed in claim 7 wherein said CPU accumulates data related to the status, call and mode of operation of said plurality of N/C machines and including a data output device connected to said CPU for producing reports at predetermined intervals related to the data accumulated by said CPU.

9. Apparatus as claimed in claim 8 wherein said data output device is an on-line teletype.

10. Apparatus as claimed in claim 9 including a maintenance teletype located in a region remote from said CPU and connected to said CPU for printing out related alphanumeric characters when certain of said digital status codes are received by said CPU, said CPU being adapted to transmit data related to said certain of said digital status codes to said maintenance teletype subsequent to the receipt of any of said certain of said digital status codes from any of said operator modules of said N/C machines.

11. Apparatus as claimed in claim 1 wherein:

each of said operator modules includes an interrogate address decoder suitable for producing an ENABLE signal when the digital interrogation code being received is the individual address code for the related operator module; and, said manually adjustable encoding means includes a plurality of manually position adjustable digital switches and a plurality of CMOS bilateral switches connected to said plurality of manual adjustable digital switches and to said interrogate address decoder such that said plurality of CMOS bilateral switches transfer information, related to the state of said manually adjustable digital switches, from their inputs to their outputs when said interrogate address decoder generates said ENABLE signal.

12. Apparatus as claimed in claim 11 wherein each of said plurality of manually adjustable switches includes a plurality of sets of single pole, double throw contacts, the position of said contacts having a digital code relationship to the manual adjustment of the switch to which they relate, and wherein a pair of CMOS bilateral switches of said plurality of CMOS bilateral switches are associated with each set of single pole, double throw switch contacts, the input of one of said pair of CMOS bilateral switches being connected to one of the remote terminals of the related single pole, double throw switch contacts and the input of the other of said pair of CMOS bilateral switches being connected to the other remote terminal of the related single pole, double throw switch contacts, whereby the outputs of said pair of said CMOS bilateral switches are in complementary form, said complementary form being related to the state of the related single pole, double throw switch contacts.

13. Apparatus as claimed in claim 12 including:

a plurality of mode status sensors, one associated with each of said N/C machines, said mode status sensors adapted to sense whether its associated N/C machine is in an N/C mode of operation, or in an override mode of operation; and, a plurality of mode encoding means, one associated with each of said mode status sensors for producing a digital machine condition code related to the information sensed by said sensing means.

14. Apparatus as claimed in claim 13 wherein each said mode encoding means comprises a pair of CMOS bilateral switches connected to said sensing means for producing push-pull voltage signals related to the information sensed by said sensing means, the control inputs of said pair of CMOS bilateral switches being connected to the ENABLE output of said interrogate address decoder.

15. Apparatus as claimed in claim 1 including:

a plurality of mode status sensors, one associated with each of said N/C machines, said mode status sensors adapted to sense whether its associated N/C machine is in an N/C mode of operation, or in an override mode of operation; and, a plurality of mode encoding means, one associated with each of said mode status sensors for producing a digital machine condition code related to the information sensed by said sensing means.

16. In a system adapted to monitor the predetermined operational parameters of a plurality of N/C machines including operator generated calls for assistance from support personnel, and, in accordance therewith, provide visual displays related to said operational status and/or reports related to said operational status, the improvement comprising at least one visual paging board located in the region wherein said N/C machines are located so as to be viewable by support personnel located in said region, said visual paging board connected so as to produce visual alphanumeric characters in accordance with said operator generated calls for assistance.

17. In an apparatus for transmitting data in parallel along a multiple wire data transmission bus through an area of relatively high electromagnetic interference, the improvement comprising a plurality of CMOS bilateral switches connected to received digitally coded data and apply said data in a voltage push-pull manner to said multiple wires of said multiple wire data transmission bus when enabled.

18. The improvement claimed in claim 12 wherein said data is produced by manually adjusting a switch adapted to produce a digital code through a plurality of single pole, double throw contacts and wherein said CMOS bilateral switches are connected on a one-to-one basis to the remote terminals of said contacts such that a pair of CMOS bilateral switches detects, in complementary form, the status of the switch to which said pair relates.

\* \* \* \* \*

UNITED STATES PATENT AND TRADEMARK OFFICE
CERTIFICATE OF CORRECTION

PATENT NO. :   4,017,831
DATED      :   April 12, 1977
INVENTOR(S) :  Tieden et al It is certified that error appears in the above-identified patent and that said Letters Patent are hereby corrected as shown below:

Column 2, line 61, after "and/or" insert —sophisticated electronic circuitry has—.

Column 3, line 10, delete "that" and insert —than—.

Column 6, lines 16 and 21, delete "sybsystem" and insert —subsystem—;

line 32, delete "illustrating" and insert —illustrated—.

Column 7, line 66, delete "varius" and insert —various—.

Column 8, line 39, delete "it" and insert —is—.

Column 10, line 34, delete "subsystemes" and insert —subsystems—.

Column 14, line 6, delete "Sw9" and insert —SW9—;

line 8, delete "Sw10-SW12" and insert —SW10-SW12—;

line 13, delete "termials" and insert —terminals—.

Column 28, line 3, delete "foregiong" and insert —foregoing—.

Claim 1, line 60, after the word "machines" delete "appropriate messages".

Signed and Sealed this twenty-sixth Day of July 1977

[SEAL]

Attest:

RUTH C. MASON
*Attesting Officer*

C. MARSHALL DANN
*Commissioner of Patents and Trademarks*